(12) United States Patent
Chen et al.

(10) Patent No.: US 8,447,524 B2
(45) Date of Patent: May 21, 2013

(54) METHOD FOR GEOPHYSICAL AND GEOLOGICAL INTERPRETATION OF SEISMIC VOLUMES USING CHRONOLOGICAL PANNING

(75) Inventors: Ganglin Chen, Houston, TX (US); Dominique G Gillard, Houston, TX (US); Matthias Imhof, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 483 days.

(21) Appl. No.: 12/623,130

(22) Filed: Nov. 20, 2009

(65) Prior Publication Data

US 2010/0161232 A1    Jun. 24, 2010

Related U.S. Application Data

(63) Continuation-in-part of application No. PCT/US2009/041671, filed on Apr. 24, 2009.

(60) Provisional application No. 61/128,547, filed on May 22, 2008, provisional application No. 61/131,484, filed on Jun. 9, 2008, provisional application No. 61/169,122, filed on Apr. 14, 2009.

(51) Int. Cl.
*G01V 1/28* (2006.01)
(52) U.S. Cl.
USPC ............... 702/16; 702/13; 702/14; 702/17
(58) Field of Classification Search
USPC ............ 703/5; 702/13, 14, 16, 17; 382/109, 382/181; 367/64, 72; 175/1
See application file for complete search history.

(56) References Cited

U.S. PATENT DOCUMENTS

| 4,759,636 | A | * | 7/1988 | Ahern et al. | 367/21 |
| 5,537,365 | A | | 7/1996 | Sitoh | 367/73 |
| 5,570,106 | A | | 10/1996 | Viswanathan | 345/133 |
| 5,940,777 | A | | 8/1999 | Keskes | 702/16 |
| 6,018,498 | A | * | 1/2000 | Neff et al. | 367/72 |

(Continued)

FOREIGN PATENT DOCUMENTS

| GB | 2375448 | 11/2002 |
| GB | 2444167 | 5/2008 |
| WO | WO2007/046107 | 4/2007 |

OTHER PUBLICATIONS

Bellman, R. (1958) "On a Routing Problem," *Quarterly of Applied Mathematics* 16, pp. 87-90.

(Continued)

*Primary Examiner* — Eliseo Ramos-Feliciano
*Assistant Examiner* — Elias Desta
(74) *Attorney, Agent, or Firm* — ExxonMobil Upstream Research Company Law Dept.

(57) ABSTRACT

A computer-implemented method is provided for searching and analyzing a seismic data volume acquired in a seismic survey to determine potential for hydrocarbon accumulations in an associated subsurface region. Surfaces describing the seismic data volume are obtained. The surfaces are enumerated. At least one enumerated surface is selected. The at least one selected surface is augmented when the selected surface does not substantially cover an area associated with the seismic data volume. The augmenting is performed until all selected surfaces substantially cover the area. The at least one selected surface is displayed, with geologic or geophysical data associated therewith, for visual inspection or interpretation, or saving digital representations thereof to computer memory or data storage.

29 Claims, 24 Drawing Sheets

U.S. PATENT DOCUMENTS

| | | | |
|---|---|---|---|
| 6,560,540 B2 | 5/2003 | West et al. | 702/14 |
| 6,708,118 B2 | 3/2004 | Stark | 702/16 |
| 6,735,526 B1 | 5/2004 | Meldahl et al. | 702/14 |
| 6,771,800 B2 | 8/2004 | Keskes et al. | 382/109 |
| 6,850,845 B2 | 2/2005 | Stark | 702/16 |
| 6,853,922 B2 | 2/2005 | Stark | 702/14 |
| 7,024,021 B2 | 4/2006 | Dunn et al. | 382/109 |
| 7,162,463 B1 | 1/2007 | Wentland et al. | 706/48 |
| 7,184,991 B1 | 2/2007 | Wentland et al. | 706/45 |
| 7,188,092 B2 | 3/2007 | Wentland et al. | 706/48 |
| 7,248,539 B2 | 7/2007 | Borgos et al. | 367/72 |
| 7,257,488 B2 | 8/2007 | Cacas | 702/2 |
| 7,280,918 B2 * | 10/2007 | Williams | 702/14 |
| 7,308,139 B2 | 12/2007 | Wentland et al. | 382/181 |
| 7,463,552 B1 | 12/2008 | Padgett | 367/73 |
| 8,065,088 B2 * | 11/2011 | Dorn et al. | 702/14 |
| 2006/0122780 A1 * | 6/2006 | Cohen et al. | 702/14 |
| 2008/0123469 A1 | 5/2008 | Wibaux et al. | 367/38 |
| 2008/0140319 A1 | 6/2008 | Monsen et al. | 702/16 |
| 2009/0204332 A1 | 8/2009 | Lomask et al. | 702/16 |

OTHER PUBLICATIONS

Cheng, Y. et al. (1989) "The Binary Consistency Checking Scheme and Its Applications to Seismic Horizon Detection," *IEEE Transactions on Pattern Analysis and Machine Intelligence*, 11(4), pp. 439-447.

Cormen, T. et al. (1990) *Introduction to Algorithms*, MIT Press and McGraw Hill, pp. 477-485 (section 23.3, "Depth-first search").

Fernández-Martinez, J. L. et al. (2009) "GenLab: A MATLAB-Based Program for Structural Analysis of Folds Mapped by GPS or Seismic Methods," *Computers & Geosciences* 35, pp. 317-326.

de Groot, P. et al. (2006) "How to Create and Use 3D Wheeler Transformed Seismic Volumes," *SEG, New Orleans*, pp. 1038-1042.

Haralick and Shapiro (1992) *Computer and Robot Vision*, vol. 1, Chapter 5, Addison-Wesley, pp. 157-261.

Huang, K. (1990) "Branch and Bound Search for Automatic Linking Process of Seismic Horizons," *Pattern Recognition* 23(6), pp. 657-667.

Li, Q. et al. (1997) "Seismic Skeletonization: A New Approach to Interpretation of Seismic Reflection Data," *Journal of Geophysical Research—Solid Earth* 102(B4), pp. 8427-8445.

Lomask, J. et al. (2006) "Flattening Without Picking," *Geophysics* 71(4), pp. P13-P20.

Lu, S. et al. (1990) "An Iterative Approach to Seismic Skeletonization," *Geophysics* 55(10), pp. 1312-1320.

Monsen, E. et al. (2007) "Geologic Process Controlled Interpretation Based on 3D Wheeler Diagram Generation," *SEG 2007 San Antonio*, pp. 885-889.

Vasudevan, K. et al. (2005) "Adaptation of Seismic Skeletonization for Other Geoscience Applications," *Geophysical Journal International* 162, pp. 975-993.

Verney, P. et al. (2008) "An Approach of Seismic Interpretation Based on Cognitive Vision," 70th *EAGE*, Rome, Italy, 5 pgs.

Zeng, H. et al. (1998) "Stratal Slicing, Part II: Read 3-D Seismic Data" *Geophysics*, 63(2), pp. 514-522.

* cited by examiner

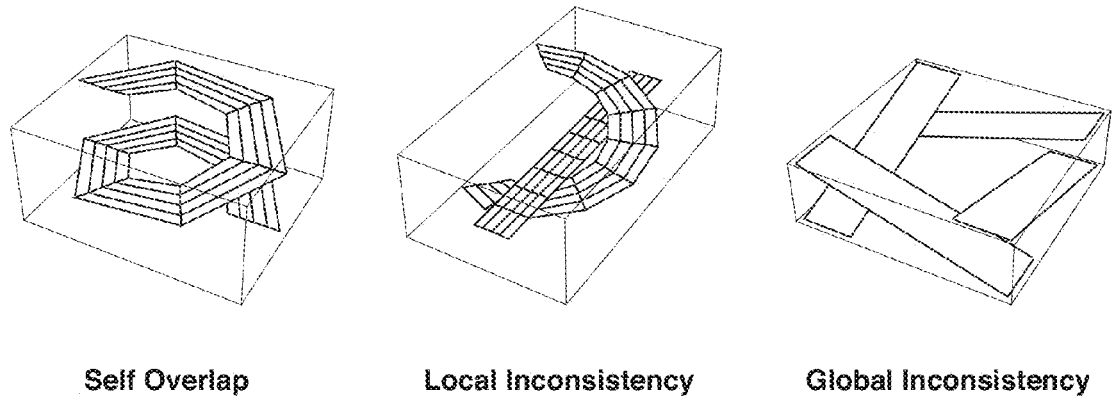
Self Overlap
Local Inconsistency
Global Inconsistency
*FIG. 3A*
*FIG. 3B*
*FIG. 3C*
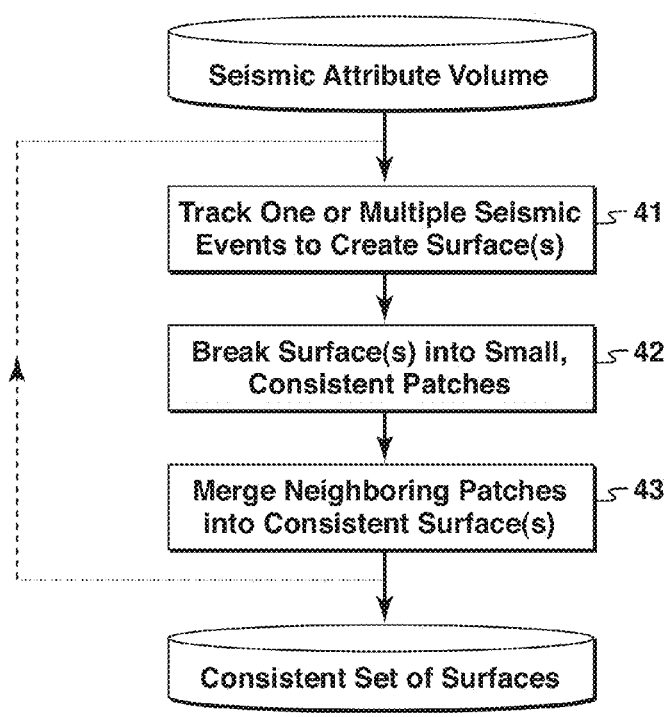
*FIG. 4*

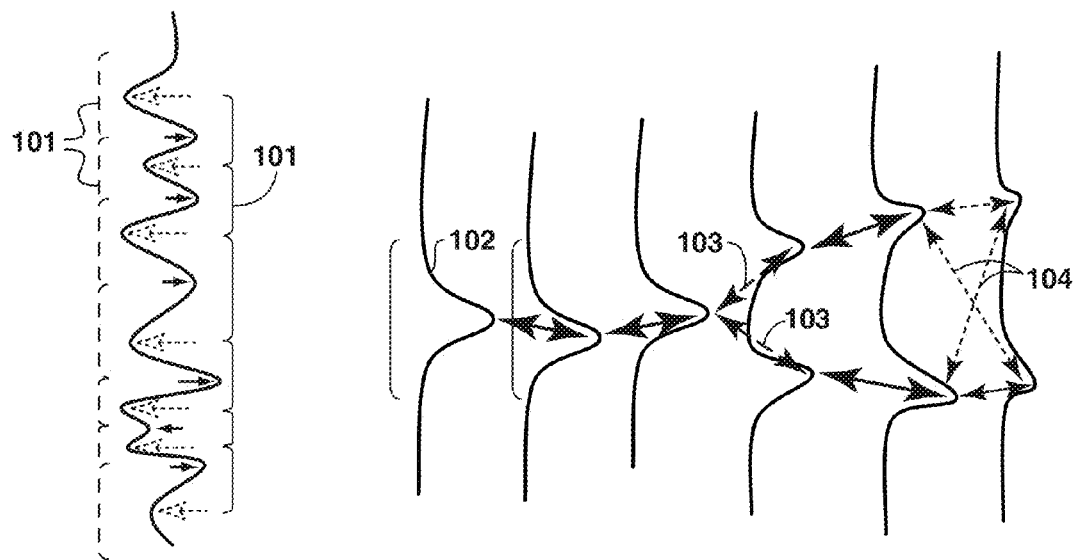
FIG. 10A
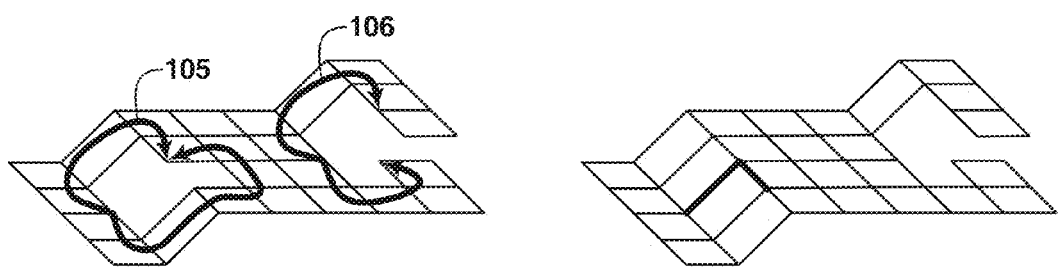
FIG. 10B
FIG. 10C

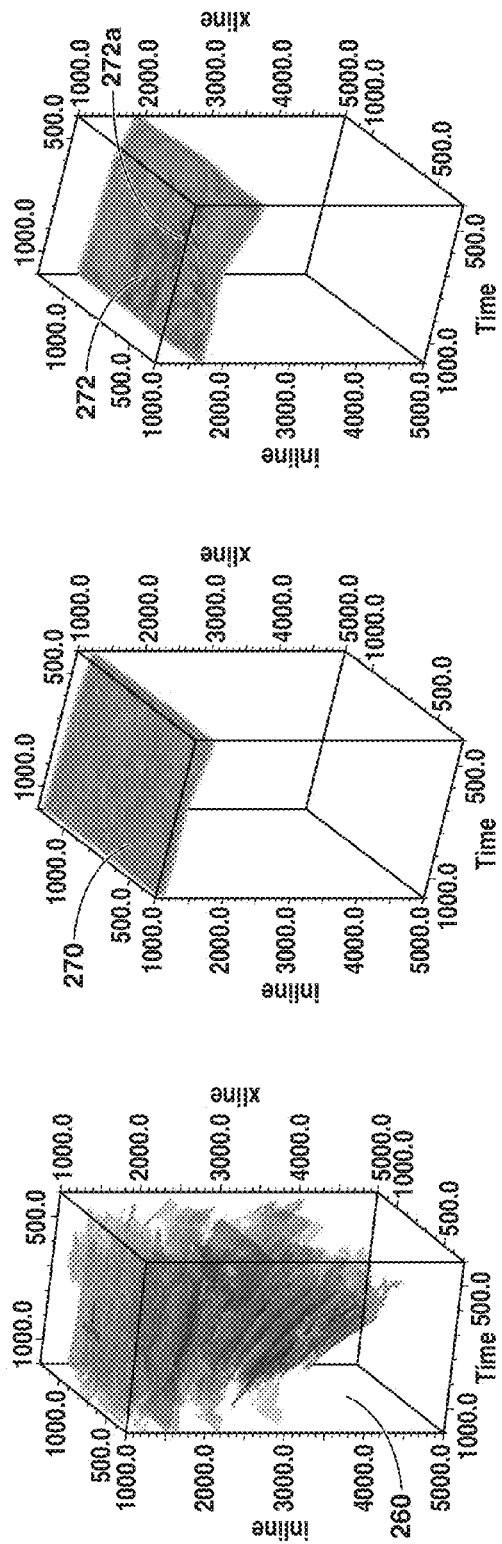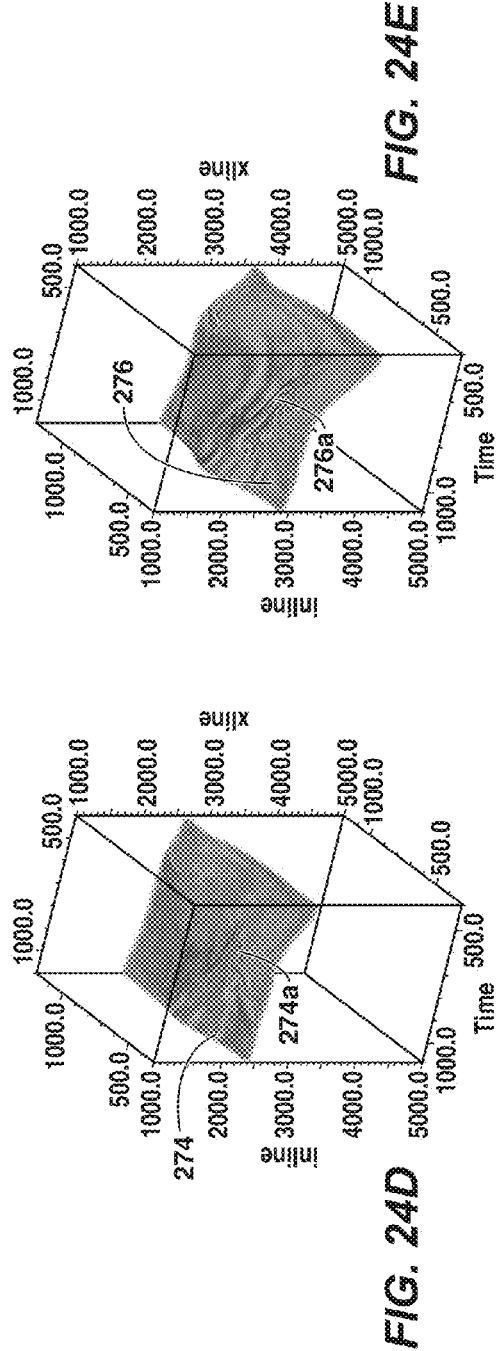
FIG. 24A  FIG. 24B  FIG. 24C  FIG. 24D  FIG. 24E

METHOD FOR GEOPHYSICAL AND GEOLOGICAL INTERPRETATION OF SEISMIC VOLUMES USING CHRONOLOGICAL PANNING

CROSS-REFERENCE TO RELATED APPLICATIONS

This application is a Continuation-in-Part of International Application PCT/US2009/041671, filed in the United States Receiving Office on 24 Apr. 2009, which claims the benefit of U.S. Provisional application 61/128,547 which was filed on May 22, 2008, U.S. Provisional application 61/131,484 which was filed on Jun. 9, 2008, and U.S. Provisional application 61/169,122 which was filed on Apr. 14, 2009.

FIELD

This invention relates generally to the field of geophysical and geologic prospecting, and more particularly to the analysis of seismic data. Specifically, the invention is a method to create objects such as surfaces and geobodies, and to automatically analyze them with the purpose of highlighting regions with a potential to contain hydrocarbons. One particular embodiment of the invention is the simultaneous creation and analysis of many stratigraphically consistent surfaces from seismic data volumes.

BACKGROUND

It is advantageous in seismic data processing and interpretation to reduce a seismic data volume to its internal reflection-based surfaces or horizons. Collectively, these surfaces form the skeleton of the seismic volume. Many methods have been described to extract or track one horizon or surface at a time through a volume of seismic data. Most of these methods create surfaces that eventually overlap themselves. Thus, the same surface may have multiple depths (or reflection times) associated with the same spatial position. Some methods prevent multi-valued surfaces by discarding all but one value per location. Typically, they store only the first one encountered during the execution of the process and simply do not record later ones. Moreover, if multiple surfaces are tracked, one surface may overlay another surface at one location, while the opposite relationship occurs at another location. Collectively, these situations may be termed topologically inconsistent. The published approaches to date, some of which are summarized below, largely ignore topological consistency.

In "The Binary Consistency Checking Scheme and Its Applications to Seismic Horizon Detection," *IEEE Transactions on Pattern Analysis and Machine Intelligence*, 11, 439-447 (1989), Cheng and Lu describe a method to extract the seismic skeleton from two dimensional data. Problems introduced by the third dimensions are neither discussed nor resolved. The procedure uses an iterative approach where strong horizons are tracked initially, while weaker ones are tracked in later iterations. At any iteration, the tracking is confined to areas delineated by horizons already tracked in earlier iterations. Tracking is preformed by correlating multiple neighboring traces simultaneously. Combining the two approaches allows incorporation of the geologic fabric into the results. This method is also described in "An Iterative Approach to Seismic Skeletonization," Lu and Cheng, *Geophysics* 55, 1312-1320 (1990).

In "Seismic Skeletonization: A New Approach to Interpretation of Seismic Reflection Data," *Journal of Geophysical Research—Solid Earth* 102, 8427-8445 (1997), Li, Vasudevan, and Cook describe the utility of using the seismic skeleton for the interpretation of seismic data. The seismic skeleton is two dimensional, and when a horizon splits, the decision regarding which branch to follow is not geologically motivated. Instead, the method attempts to correlate events across three neighboring traces in such a way that dip changes are minimized. The method includes only iterative growing of horizons.

Further, "Adaptation of Seismic Skeletonization for Other Geoscience Applications," Vasudevan, Eaton, and Cook, *Geophysical Journal International* 162, 975-993 (2005), is a continuation of the earlier work, realizing that skeletonization has geoscience applications beyond seismic processing and interpretation.

In "Branch And Bound Search For Automatic Linking Process Of Seismic Horizons," Huang, *Pattern Recognition* 23, 657-667 (1990), Huang discloses a two dimensional method of horizon growth allowing horizons to cross and penetrate each other, which violates the stratigraphic paradigm that geologic strata do not cross. The method reveals only the generation of horizons by picking events, peaks for example, building a tree of all potential linkages between these events, and then selecting the ones which yield the most linear horizons. Branches of the linage tree are chosen to minimize a cost function of horizon nonlinearity.

"How To Create And Use 3D Wheeler Transformed Seismic Volumes," de Groot, de Bruin, and Hemstra, SEG 2006 discloses an interpretation method that interpolates horizons with sub-sampling resolution by following the local dips and strikes, organizes these horizons in sequential order, and visualizes these horizons or attributes thereon in a depositional domain by flattening of the horizons or attribute volumes along the horizons. Specifically, the algorithm requires the input of major horizons which need to be picked with an alternative method, such as manual picking. Within an interval bracketed by major horizons, minor horizons are interpolated either parallel to the top or bottom horizons, linearly interpolated in between, or following the local dip and strike orientations estimated from seismic attributes. By construction, the interpolated minor horizons are not crossing through each other.

In a paper submitted for the $70^{th}$ EAGE (European Association of Geoscientists and Engineers) Conference and Exhibition, Rome, Italy, Jun. 9-12, 2008, and available for download at www.earthdoc.org beginning May 26, 2008, entitled "An Approach of Seismic Interpretation Based on Cognitive Vision," Verney et al. disclose a method for geology-based interpretation of seismic data by using artificial intelligence tools based on "cognitive vision." First order reflector continuity is detected using voxel connectivity in the seismic data. Then, a visual characterization step is performed. For example, chronological relationships are established based on whether a reflector lies above or below another. Finally, geological horizons are identified from the reflectors by fusing all nodes that (a) share similar visual attributes (amplitude, thickness, dip), and (b) are located at similar distances from at least one other reflector. The result is a set of chronologically ordered horizons.

U.S. Pat. No. 7,024,021, "Method for Performing Stratigraphically-Based Seed Detection in a 3-D Seismic Data Volume," to Dunn and Czernuszenko, discloses a three-dimensional geobody picker and analyzer. In this patent, a few select geobodies are picked, which may include geobodies having attribute values within a specified range or geobodies adjacent to certain attribute values. During picking, the geobodies are analyzed using a map view criteria to detect and eliminate self-overlapping geobodies, and yielding composite geobodies instead. The composite geobodies satisfy at least the topological condition of no self overlaps, but the boundaries between geobodies are determined by the order in which the voxels are detected.

In "System and Method for Displaying Seismic Horizons with Attributes" (PCT Patent Application Publication No. WO 2007046107), James discloses a seismic autopicker that generates single valued horizons and often takes the correct branch when horizons split. The interpreter initializes the method by manually selecting one or multiple seed points within the seismic data volume. The algorithm uses the seed points to pick a set of secondary points from neighboring traces which are then treated as new seed points, and the procedure repeats. Secondary picks that led to self overlap are rejected, but topological consistency with other horizons is not revealed. The algorithm is basically based on controlled marching.

U.S. Pat. No. 7,257,488 to Cacas ("Method of Sedimentologic Interpretation by Estimation of Various Chronological Scenarios of Sedimentary Layers Deposition") discloses a method of organizing seismic and geologic horizons into a hierarchy using the above/below relationships to facilitate their stratigraphic interpretation. The method automatically extracts pertinent information for sedimentologic interpretation from seismic data by using estimations of realistic chronological scenarios of sedimentary layers deposition. The algorithm begins by thresholding the seismic data and using morphological thinning to create individual horizons. If multiple horizons intersect, then the most linear pair is combined, while the others are explicitly disconnected. The method then iteratively estimates a first and a second chronological scenario of the deposition of sedimentary layers, assuming respectively that each reflector settles at the earliest and at the latest possible moment during the sedimentary depositional process. Starting with reference horizons, the algorithm basically enumerates the horizons upwards and downwards to establish relative orders. An interpretation of these two chronological scenarios is eventually carried out so as to reconstruct the depositional conditions of the sedimentary layers.

The differences in the relative orders are used to estimate the scenario uncertainty.

GB Patent No. 2,444,167 to Cacas ("Method for Stratigraphic Interpretation of Seismic Images") discloses a method for stratigraphic interpretation of a seismic image for determination of the sedimentary history of the subsurface. The method involves automatically tracking events creating at least one horizon, selecting horizons with similar seismic attributes extracted from a window at or near the horizons, and flattening the seismic volume along the selected horizons.

U.S. Pat. No. 7,248,539 to Borgos ("Extrema Classification") discloses a method of horizon patch formation and merging by common membership in clusters of waveforms and patch properties. The method picks horizons by extracting, e.g., all peaks, but correlates them by clustering of waveforms. Picks belonging to the same cluster are used to define horizons patches which are merged into larger horizons by properties such as cluster indices, position, or seismic attributes. Specifically, the method defines with sub-sample precision the positions of seismic horizons through an extrema representation of a 3D seismic input volume. For each extrema, it derives coefficients that represent the shape of the seismic waveform in the vicinity of the extrema positions and sorts the extrema positions into groups that have similar waveform shapes by using unsupervised or supervised classification of these coefficients. It then extracts surface primitives as surface segments that are both spatially continuous along the extrema of the seismic volume and continuous in class index in the classification volume. By filtering on properties, such as class index, position, attribute values, etc. attached to each patch, a set of patches can be combined into a final horizon interpretation. Three primary applications of the surface primitives are revealed: combining surface primitives into complete horizons for interpretations; defining closed volumes within the seismic volume as the closure of vertically arranged surface primitives; or estimating fault displacement based on the surface primitives.

Monsen et al. ("Geologic-process-controlled interpretation based on 3D Wheeler diagram generation," *SEG* 2007) extended U.S. Pat. No. 7,248,539 to Borgos by extracting above/below relationships for the patches and used these relationships to derive a relative order of patches which satisfies these constraints by application of a topological sort. Flattened horizons are then positioned in this relative order to allow interpretation in the depositional Wheeler domain. The SEG abstract is the basis for U.S. Patent Application Publication No. US 2008/0140319, published on Jun. 12, 2008.

GB Patent No. 2,375,448 to Pedersen ("Extracting Features from an Image by Automatic Selection of Pixels Associated with a Desired Feature, Pedersen") discloses a method to construct surfaces, such as horizons and faults from a few select seed points. The method interpolates between the seed points and extrapolates away from the seed points by generating many paths which slowly converge to lines (in two dimensions) or surfaces (in three dimensions). The method is based on the way ants leave the colony to forage for food. Initially, their paths are nearly random, but each ant leaves a trail of pheromones. Ants follow each other's scent, and over time, short successful paths emerge. This strategy was adapted to horizon tracking where success is defined by the coherency of the seismic data along the path. For fault picking, success appears to be defined by the incoherency along the path. Over time, individual segments grow, and some may merge to form larger surfaces. In a follow-up step, segments are connected depending on their orientations and projected trajectories.

U.S. Pat. No. 5,570,106 ("Method and Apparatus for Creating Horizons from 3-D Seismic Data") to Viswanathan discloses a method for computer-assisted horizon picking by allowing the user to delete partial horizons and use the remaining horizon as seed points for automatic picking.

U.S. Pat. No. 5,537,365 ("Apparatus and Method for Evaluation of Picking Horizons in 3-D Seismic Data") to Sitoh discloses a method to evaluate the quality of horizon picks by applying different picking strategies and parameter to allow crosschecking of results.

U.S. Pat. No. 6,850,845 to Stark discloses a method to convert seismic data to a domain of relative geologic time of deposition. The method is based on the unwrapping of seismic instantaneous phase data.

U.S. Pat. No. 6,771,800 ("Method of Chrono-Stratigraphic Interpretation of A Seismic Cross Section Or Block") to Keskes et al. discloses a method to transform seismic data into the depositional or chronostratigraphic domain. They construct virtual reflectors, discretize the seismic section or volume, count the number of virtual reflectors in each pixel or voxel, and renormalizing this histogram. By doing this procedure for every trace, they create a section or volume where each horizontal slice approximates a horizon indicating a geologic layer deposited at one time. This section or volume is then used to transform the data into the depositional or chronostratigraphic domain. However, the reference does not disclose the creation of surfaces, nor breaking or merging of surfaces, nor topology or topological consistency.

What is needed is a method that generates topologically consistent reflection horizons from seismic (or attribute) data or any geophysical data, preferably one that generates multiple horizons simultaneously. The present invention fulfills this need.

SUMMARY

In one embodiment, the invention can be a method for merging surfaces identified in a seismic or seismic attribute data volume to form larger surfaces representing subterranean geologic structure or geophysical state of matter, comprising merging neighboring surfaces in a topologically consistent way. In some embodiments, topologically consistent can be defined as verifying that surfaces satisfy each of (i) no self overlaps; (ii) local consistency; and (iii) global consistency. In a more detailed embodiment, the method can be a computer-implemented method for transforming a seismic data volume acquired in a seismic survey to a corresponding data volume which, when visually displayed, shows a representation of subterranean reflector surfaces that gave rise to the data by reflecting seismic waves, where the method comprises (a) picking seismic reflections from the data volume, and creating initial surfaces from the picks; (b) breaking surfaces into smaller parts ("patches") that are predominantly topologically consistent; (c) merging neighboring patches in a topologically consistent way, thus extracting topologically consistent reflection-based surfaces from the seismic data volume; and (d) displaying the extracted surfaces (i.e., skeleton) for visual inspection or interpretation, or saving their digital representations to computer memory or data storage. Optionally, steps (b)-(c) may be repeated at least once using the surfaces from step (c) of one iteration in step (b) of the next.

In step (a) above, the seismic reflections may be picked by correlating reflection events between neighboring traces in the seismic data volume. The correlation may connect data peaks and troughs using cross-event semblance or correlation coefficient as a correlation measure, wherein a connection is accepted if the correlation measure is greater than a preselected threshold but rejected if less than the threshold. In some embodiments of the invention, only unique correlations are accepted. Alternatively, there may be identified and also accepted multiply correlated connections characterized by two or more correlations from a single peak, trough or zero crossing all exceeding the threshold. Before merging neighboring patches in step (c), the patches may be edited for topological consistency and topologically inconsistent patches may be deleted, or data voxels causing inconsistency may be deleted.

In step (b) above, breaking surfaces into patches can be accomplished by shrinking initial surfaces to lines, removing joints in the lines to form more individual lines, shrinking individual lines to single-voxel points (characteristic points), and propagating the characteristic points along the initial surfaces by adding neighboring voxels to form patches of voxels. Wildfire propagation may be used in propagating points along the initial surfaces, e.g. circumferentially adding sequentially larger layers one voxel thick around each characteristic point, each propagation being limited to the surface from which the corresponding characteristic point was shrunk. The sequential circumferential addition of voxels may be halted where different patches meet, thus preventing any voxel from belonging to more than one patch. The propagation may be restricted such that all voxels in any patch trace back before shrinking to the same initial surface. Shrinking may be performed in different ways, for example by morphological thinning. The shrinking of a line to a point may be accomplished by shrinking the line at the same rate from each end simultaneously. The shrinking of surfaces to lines may be done by medial axes transformation. If, during the propagation of points, a point is rejected for addition to a patch because of lack of topological consistency, it may be designated an additional characteristic point.

In a more general embodiment, the invention can be a method for exploring for hydrocarbons, comprising: (a) obtaining a data volume of seismic or seismic attribute data resulting from a seismic survey; (b) subdividing the data volume into parts, called objects (optionally, this step may be performed by the skeletonization method of the preceding paragraph); (c) forming regions of one or more objects; (d) developing or selecting a measure for ranking the regions in terms of potential to represent a geobody, interface surface, or intersection of these, or other physical geologic structure or geophysical state of matter that is indicative of hydrocarbon deposits; and (e) using the measure to prioritize regions, and then using the prioritization to assess the volume for hydrocarbon potential.

In another embodiment, the invention can be a method for producing hydrocarbons from a subsurface region. The method includes (a) obtaining a seismic data volume representing the subsurface region; (b) obtaining a prediction of the potential for hydrocarbon accumulations in the subsurface region based at least partly on topologically consistent reflection-based surfaces extracted from the seismic data volume by the skeletonization method described above; and (c) in response to a positive prediction of hydrocarbon potential, drilling a well into the subsurface region and producing hydrocarbons.

Further, one or more of the embodiments of the method may include using the topologically consistent reflection-based surfaces to predict or analyze potential for hydrocarbon accumulations; wherein topologically consistent means at least one of (i) no self overlaps; (ii) local consistency, e.g., one surface cannot be above a second surface at one location but beneath it at another; and (iii) global consistency, meaning e.g. for three surfaces A, B and C, if A overlies B and B overlies C, C cannot overlie A at any location; wherein topologically consistent means all three of (i), (ii) and (iii); wherein the seismic reflections are picked by correlating reflection events between neighboring traces in the seismic data volume; wherein correlation connects data peaks and troughs using cross-event semblance or correlation coefficient as a correlation measure, wherein a connection is accepted if the correlation measure is greater than a preselected threshold but rejected if less than the threshold; wherein the picking is automated, using a computer; and wherein the patches are edited for topological consistency, and topologically inconsistent patches are deleted, or data voxels causing inconsistency are deleted, before merging neighboring patches.

Moreover, one or more of the embodiments of the method may include wherein breaking surfaces into patches comprises shrinking initial surfaces to lines, removing joints in the lines to form more individual lines, shrinking individual lines to single-voxel points (characteristic points), propagating the characteristic points along the initial surfaces by adding neighboring voxels to form patches of voxels; where each characteristic point is labeled with a different label, and the label is applied to the patch formed around the characteristic point, thus providing a means to keep track of different patches as they are expanded by propagation; wherein wildfire propagation is used in propagating points along the initial surfaces, comprising circumferentially adding sequentially larger layers one voxel thick around each characteristic point, each propagation being limited to the surface from which the corresponding characteristic point was shrunk; wherein the sequential circumferential addition of voxels is halted where different patches meet, thus preventing any voxel from belonging to more than one patch; wherein propagation is restricted such that all voxels in any patch trace back before shrinking to the same initial surface; wherein controlled marching is used to propagate points along initial surfaces; wherein shrinking of an initial surface to a line comprises successively removing one-voxel-thick layers from the periphery of the surface until a continuous line of individual voxels results; further comprising deleting joint voxels from lines to form more lines before shrinking lines to points; wherein shrinking of a line to a point is accomplished by shrinking the line at the same rate from each end simultaneously; wherein shrinking is done by morphological thinning; wherein shrinking of surfaces to lines is done by medial axes transformation; and wherein topological consistency is enforced during the propagation of points; wherein a point that is rejected for addition to a patch because of topological consistency is designated an additional characteristic point.

Further still, one or more embodiments of the method may include wherein merging neighboring patches in a topologically consistent way is performed by developing overlap and neighbor tables for the patches, generating an order for merge pair candidates by sorting the overlap and neighbor tables, checking candidate merges for topological consistency using the overlap and neighbor tables, and accepting topologically consistent mergers; wherein the sort order of the neighbor table is based on geometries of, or geometry differences between, the neighboring patches, or is based on the statistical properties of, or the differences between, one or more attributes extracted from seismic data collocated with the patches; wherein only unique correlations are accepted; identifying and also accepting multiply correlated connections characterized by two or more correlations from a single peak, trough or zero crossing all exceeding the threshold; spatially flattening the topologically consistent reflection-based surfaces into an order representing the sequence of deposition using the topologically consistent reflection-based surfaces and using the flattened surfaces to predict or analyze potential for hydrocarbon accumulations; flattening the associated seismic data within which the topologically consistent reflection-based surfaces exist; wherein the seismic data flattening is performed by nonlinear stretch of the seismic data or by a cut and past method; wherein every step is automated using a computer; repeating steps (b)-(c) at least once using the surfaces from step (c) of one iteration in step (b) of the next; creating a visual representation (i.e. a tree) showing depositional order or hierarchy of the topologically consistent reflection-based surfaces; using the tree to select one or more surfaces for visualization; using the patches to segment the seismic data volume into three-dimensional bodies or inter-surface packages that represent geologic units that were deposited within a common interval, and using them to analyze for hydrocarbon potential; analyzing the location and characteristics of edges and termination points of the topologically consistent reflection-based surfaces and using that to assist in predicting or analyzing potential for hydrocarbon accumulations; analyzing attributes and geometric characteristics of the topologically consistent reflection-based surfaces and/or the associated seismic data at the locations of said surfaces to assist in predicting or analyzing potential for hydrocarbon accumulations using the patches or topologically consistent reflection-based surfaces to reduce the amount of information contained in the seismic data volume in order, thereby reducing storage or computational efficiency requirements for subsequent data processing of the seismic data; and wherein merging neighboring patches is restricted to patches that trace back before shrinking to the same initial surface.

In another aspect, a computer-implemented method is provided for searching and analyzing a seismic data volume acquired in a seismic survey to determine potential for hydrocarbon accumulations in an associated subsurface region. Surfaces describing the seismic data volume are obtained. The surfaces are enumerated. At least one enumerated surface is selected. The at least one selected surface is augmented when the selected surface does not substantially cover an area associated with the seismic data volume. The augmenting is performed until all selected surfaces substantially cover the area. The at least one selected surface is displayed, with geologic or geophysical data associated therewith, for visual inspection or interpretation, or saving digital representations thereof to computer memory or data storage.

According to methodologies and techniques, the obtained surfaces may be derived from the seismic data volume using skeletonization. The at least one selected surface may be displayed sequentially. The at least one selected surface may be displayed sequentially according to an enumeration order of the at least one selected surface. Geologic or geophysical data within a specified distance or depositional age from each surface may be displayed or saved. Geologic or geophysical data between adjacent surfaces may be displayed or saved. Geologic or geophysical data on each surface may be displayed or saved. Geologic or geophysical data within a specified seismic travel time of each surface may be displayed or saved. Augmenting the at least one surface may include adding seismic data from surfaces having an identifiable relationship with the at least one surface. The identifiable relationship may be one of a closest geologic age or depth, a nearest older or younger age, and a most proximal older or younger depth. The identifiable relationship may be a common geologic or geophysical attribute. Data relating to each surface may be interpolated and smoothed when each surface substantially covers the area, to thereby digitize the surface. The displayed data may be used to predict or analyze potential for hydrocarbon accumulations. A visual representation of the enumerated surfaces may be created. The surfaces may be displayed or saved as an earth model. The obtained surfaces may be topologically consistent. The term topologically consistent may mean verifying that surfaces satisfy at least one of (i) no self overlaps, (ii) local consistency, and (iii) global consistency. Enumerating the surfaces may include a chronological sorting or a top-down enumeration. The at least one enumerated surface may be selected by selecting every $M^{th}$ enumerated surface, where M is an integer less than the number of enumerated surfaces. The at least one enumerated surface may be selected according to one of age and depth. A presence of hydrocarbons in the subsurface region may be predicted using the displayed surfaces, and hydrocarbons may be managed based on the predicted presence. The at least one enumerated surface may be selected by generating one or more planes in a volume in which the surfaces are enumerated, and for each plane, selecting an enumerated surface associated therewith. The one or more planes may represent one or more seismic return times. The one or more planes may represent an estimated age or depth in the volume in which the surfaces are enumerated.

According to other methodologies and techniques, selecting at least one enumerated surface may include defining one or more intervals in a volume in which the surfaces are enumerated, selecting at least one surface associated with each of the one or more intervals, and for each interval, augmenting the at least one surface when the surface does not substantially cover an area associated with the seismic data volume. The augmenting may be performed until all selected surfaces in each selected interval substantially cover the area. For each interval, the surface may be displayed, with geologic or geophysical data associated therewith, for visual inspection or interpretation, or saving digital representations thereof to computer memory or data storage. Each of the one or more intervals may be defined as a region between two substantially horizontal planes in the volume in which the surfaces are enumerated.

In still another aspect, a computer-implemented method is provided for searching and analyzing a seismic data volume acquired in a seismic survey to determine potential for hydrocarbon accumulations in an associated subsurface region. Surfaces describing the seismic data volume are obtained. The surfaces are enumerated. At least one or more intervals are defined in a volume in which the surfaces are enumerated. At least one surface associated with each of the one or more intervals is selected. For each interval, the at least one surface is augmented when the surface does not substantially cover an area associated with the seismic data volume. The augmenting is performed until all selected surfaces in each selected interval substantially cover the area; for each interval, the surface is displayed, with geologic or geophysical data associated therewith, for visual inspection or interpretation, or saving digital representations thereof to computer memory or data storage. Each of the one or more intervals may be defined as a region between two planes in the volume in which the surfaces are arranged.

In yet another aspect, a computer program product is provided having computer executable logic recorded on a tangible, machine readable medium. The computer program product includes: code for obtaining surfaces describing a seismic data volume that represents a subsurface region; code for enumerating the surfaces; code for selecting at least one enumerated surface; code for augmenting the at least one selected surface when the selected surface does not substantially cover an area associated with the seismic data volume, said augmenting being performed until all selected surfaces substantially cover the area; and code for displaying the at least one selected surface, with geologic or geophysical data associated therewith, for visual inspection or interpretation, or saving digital representations thereof to computer memory or data storage.

BRIEF DESCRIPTION OF THE DRAWINGS

The present invention and its advantages will be better understood by referring to the following detailed description and the attached drawings in which:

FIGS. 3A-3C illustrate three types of topological inconsistency between one or multiple layers or surfaces;

FIG. 4 is a flow chart showing one embodiment of the present inventive method for topological skeletonization of seismic data volumes;

FIGS. 10A-10C illustrate event tracking and editing by filling gaps in surfaces after event tracking;

FIG. 24A is a volume of surfaces taken from seismic data;

FIGS. 24B, 24C, 24D, and 24E are selected surfaces at various depths.

Figure 1:
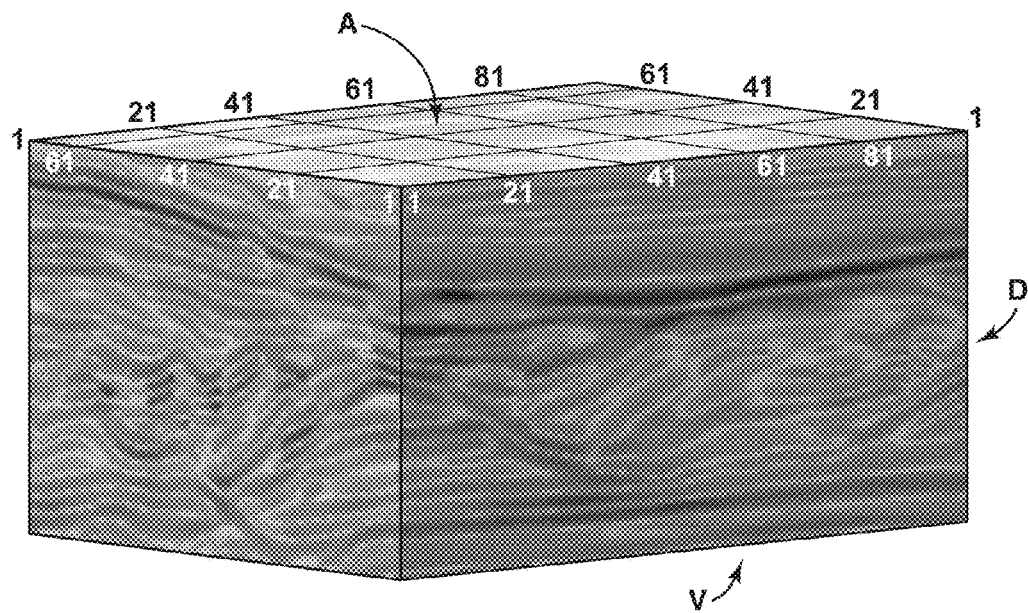
FIG. 1 is a computer display of a volume of seismic amplitude data ready for interpretation, such as the tracking of seismic horizons in three dimensions.

Example embodiments will now be described. To the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Some portions of this detailed description are presented in terms of procedures, steps, logic blocks, processing and other symbolic representations of operations on data bits within a memory in a computing system or a computing device. These descriptions and representations are the means used by those skilled in the data processing arts to most effectively convey the substance of their work to others skilled in the art. In this detailed description, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated otherwise as apparent from the following discussions, terms such as "searching", "analyzing", "obtaining", "enumerating", "selecting", "augmenting", "performing", "displaying", "saving", "deriving", "defining", "adding", "interpolating", "smoothing", "digitizing", "predicting", "creating", "verifying", "managing", or the like, may refer to the action and processes of a computer system, or other electronic device, that transforms data represented as physical (electronic, magnetic, or optical) quantities within some electrical device's storage into other data similarly represented as physical quantities within the storage, or in transmission or display devices. These and similar terms are to be associated with the appropriate physical quantities and are merely convenient labels applied to these quantities.

Embodiments disclosed herein also relate to an apparatus for performing the operations herein. This apparatus may be specially constructed for the required purposes, or it may comprise a general-purpose computer selectively activated or reconfigured by a computer program or code stored in the computer. Such a computer program or code may be stored or encoded in a computer readable medium or implemented over some type of transmission medium. A computer-readable medium includes any medium or mechanism for storing or transmitting information in a form readable by a machine, such as a computer ('machine' and 'computer' are used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable transmission medium, for transmitting signals such as electrical, optical, acoustical or other form of propagated signals (e.g., carrier waves, infrared signals, digital signals, etc.)).

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

In order to search for hydrocarbon accumulations in the earth, geoscientists are using methods of remote sensing to look below the earth's surface. A routinely used technique is the seismic reflection method where man-made sound waves are generated near the surface. The sound propagates into the earth, and whenever the sound passes from one rock layer into another, a small portion of the sound is reflected back to the surface where it is recorded. Typically, hundreds to thousands of recording instruments are employed. Sound waves are sequentially excited at many different locations. From all these recordings, a two-dimensional (2D) or three-dimensional (3D) image of the subsurface can be obtained after data processing. Seismic interpretation often involves the picking of surfaces to characterize the subsurface for the delineation of underground features relevant to the exploration, identification and production of hydrocarbons. The present invention describes a method to pick multiple surfaces simultaneously. That is, embodiments of the present inventive method may be used to pick many or all of these surfaces at once.

The ability to pick many surfaces simultaneously (i.e., the ability to skeletonize seismic data) enables a pattern recognition or machine learning method to search geological or geophysical data for direct indications of hydrocarbons or elements of the hydrocarbon system such as reservoir, seal, source, maturation and migration to determine and delineate potential accumulations of hydrocarbons.

In application for geophysical or geological interpretation, there is often a distinction made between the terms 'horizon' and 'surface'. As used herein, a surface and horizon may be used interchangeable. The present invention is a method that generates multiple surfaces simultaneously, while forcing individual surfaces to be single valued and all surfaces to be topologically consistent. Surfaces that using traditional methods are multi-valued or topologically inconsistent are replaced with a set of smaller patches, each of which is single-valued and topologically consistent with all other surfaces. This method creates surfaces that represent many or all reflection surfaces contained in a seismic data volume. It generates the skeletonized representation of the seismic data, which greatly reduces the amount of data. Beneficially, it organizes and presents the seismic data in a geologically intuitive manner, which facilitates seismic interpretation and characterization of the subsurface, and thus the delineation of underground features relevant to the exploration and production of hydrocarbons.

Figure 2:
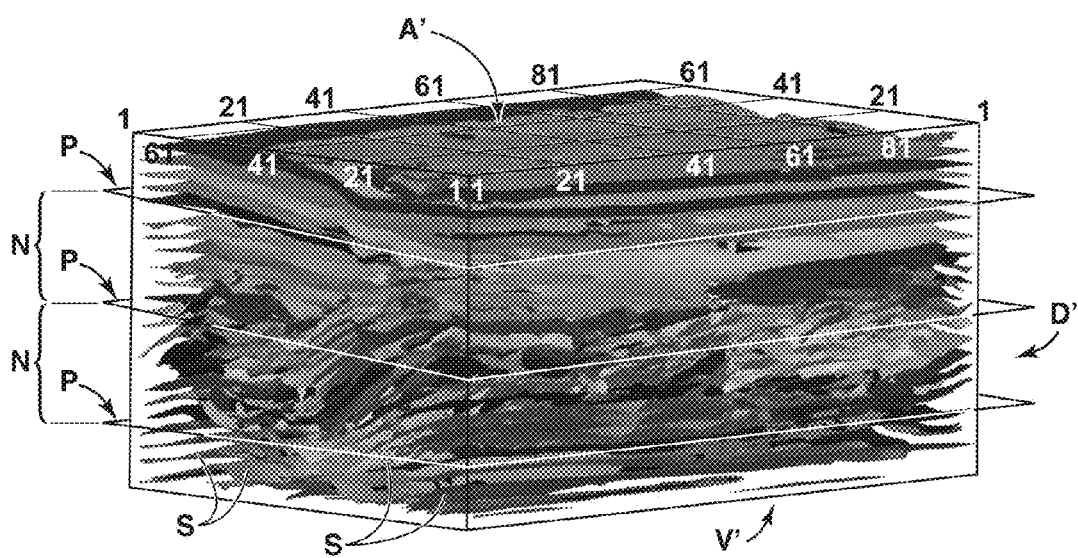
FIG. 2 shows four hundred fifty (450) surfaces that correspond to peak and trough reflection horizons, extracted from the seismic data volume of FIG. 1 by the present inventive method, all surfaces being topologically consistent.

FIG. 1 presents an example of a seismic amplitude volume. Correlating the peaks (bright) or troughs (dark) from one trace to the next allows definition of surfaces. Using one embodiment of the present inventive method, four hundred fifty surfaces shown in FIG. 2 are extractable for this example volume of FIG. 1. The number grid shown on FIGS. 1 and 2 and other similar drawings denote discrete coordinates of the seismic survey, determined by source and receiver locations.

Many seismic surfaces correspond to interfaces between layers of subsurface rock. Each layer is a packet of rock that was deposited at roughly the same time. Given two juxtaposed layers, the deeper one was created earlier, and the shallower one later. The science of stratigraphy, i.e., the science of rock layer sequences, suggests that such a relationship persists spatially. If one layer overlays another layer at one location, then it overlays this layer everywhere it is present. The main exceptions are caused by structural complexity such as overthrusts, reverse faults, or overturned folds. In at least one embodiment of the present invention, topologically consistent means that the following three conditions are satisfied with regard to the geometric arrangement of rock layers.

1. A rock layer may not overlap itself. If a layer overlaps itself, it is simultaneously younger and older than itself and the rock sandwiched in between. This statement may be called the condition of No Self Overlaps, illustrated in FIG. 3A.
2. Two layers cannot reverse their depositional relationship. One layer may not be above another at one location, and below it at another location. Otherwise, one layer is both older and younger than the other one. This statement may be called the condition of Local Consistency, illustrated in FIG. 3B.
3. Sets of layers must preserve transitivity. Above/below or younger/older are examples of transitive relations. If layer one is above layer two, and layer two is above layer three, then layer three must be below layer one. Otherwise, layer one is both older and younger than layer three. This statement may be called the condition of Global Consistency, illustrated in FIG. 3C.

It may be noted that the no-self-overlap condition is a special case of the local consistency condition, and that the local consistency condition is a special case of the global consistency condition. The first condition, however, is much easier to check than the other two, and the second condition is much easier to check than the third condition. For computational efficiency, it is useful to treat all three conditions separately, even if the third one actually incorporates the others. Alternatively, the no self overlaps condition may be defined such that it applies to one surface, the local consistency condition may be defined such that it applies only when two different surfaces are involved, and the global consistency condition may be defined such that it applies only when at least three different surfaces are involved, in which case the three conditions are mutually exclusive.

If seismic reflection events are caused by sound waves passing from one layer into another one, and thus often correlate with the interfaces between rock layers, then seismic reflection surfaces also need to satisfy these three conditions. The same can be said for any phase rotated version of the seismic data, although the reflection events in such data do not necessarily correlate with lithologic interfaces. For a set of surfaces with associated above/below relations, the three above-listed conditions can be used to check the overall consistency of these surfaces. Surfaces violating the conditions are either not caused by layers of rock, or have been tracked incorrectly. Surfaces not related to layers include faults, fluid contacts, or events blended from thin-layer reflections. Tracking errors may relate to noise, seismic acquisition and processing artifacts, or thin-layer tuning.

For a given set of layers (or surfaces), the collection of above/below (or younger/older) relationships are defining their topology. A set of layers that satisfies at least one of the three conditions, preferably all three, are termed topologically consistent. In the discussion of example embodiments given below, where in the context it matters, topologically consistent means that all three conditions are satisfied. For a topologically consistent set of layers, an overall order of the different events may be defined by performance of a topological sort on these relations (e.g., Skiena, *The Algorithm Design Manual*, Springer, 273-274 (1998)). Typically, without application of the embodiments of the present inventive method, establishing an order of surfaces is problematic and/or impossible due to conflicting relations between layers (or surfaces). These topological inconsistencies typically cause the topological sort to fail. The argument can be turned around to test for topological consistency: the surfaces are consistent if and only if the topological sort succeeds. One of the objectives of the present invention is to establish consistency between surfaces. If the topological sort succeeds, the surfaces are topologically consistent. If the topological sort fails, the surfaces are topologically inconsistent. Moreover, the topological sorting algorithm identifies the surfaces that cause the inconsistency. Consistency does not imply that the resulting surface order is unique. For example, two small, adjacent but non-overlapping surfaces are topologically consistent and result in a successful topological sort. Yet, the resulting linear sort order is non-unique, i.e., either surface could be listed first without violating any of the above/below constraints or conditions.

Many small surfaces are more likely to be topologically consistent than a few large ones. In the small-size limit, every surface extends for only one point in the vertical and lateral direction, and thus, by construction, these single-point surfaces are topologically consistent. The embodiments of the present inventive method are based in part on this observation. FIG. 4 is a flow chart showing basic steps in one embodiment of the present inventive method for the skeletonization of a seismic data volume. Typically, the seismic volume is a full stack amplitude volume, but any seismic or seismic attribute volume could be used.

At step 41, seismic reflection surfaces are tracked through the seismic volume to find the raw, potentially multi-valued surfaces. In this context, a seismic event is either a peak (an attribute maximum), a trough (an attribute minimum), a zero crossing from a peak to a trough, or a zero crossing from a trough to a peak. All events of one or more kinds are picked and related to the events on neighboring seismic traces. In the present example, both peaks and troughs are picked. As such, this step involves picking seismic reflections from the data volume, and creating initial surfaces from the picks.

At step 42, the surfaces generated by step 41 are broken into a set of small patches. These patches are preferably small enough that they are predominantly topologically consistent with each other, and those that are not may be easily made so by erasing a few single points (i.e., data voxels or pixels) or even deleting entire small patches that create the topological inconsistencies. As such, this step involves breaking the surfaces into smaller parts ("patches") that are predominantly topologically consistent.

At step 43, larger surfaces are created from multiple small patches by merging neighboring ones. As provided in step 42, all patches are topological consistent. In the present example embodiment, a determination is made for every patch which patches it overlaps and whether it is above or below each of these patches. Furthermore, for every patch, its neighbors (i.e., patches at a similar level that contain traces adjacent to the patch being analyzed) are identified. Neighboring patches potentially belong to the same surface and are merged if the resulting combination does not cause a topological inconsistency. This step may be referred to as the topological merge procedure. As such, this step involves merging neighboring patches in a topologically consistent way, thus extracting topologically consistent reflection-based surfaces from the seismic data volume.

After one, multiple, or all neighboring patches are topologically merged, the result is a set of surfaces that are topologically consistent by construction. They may be stored in computer memory to be used for interpretation and characterization of the subsurface.

In some regions of the seismic data volume, the tracking procedure (preferably automated) may miscorrelate events between traces. In other areas, poor data quality may prevent the seismic event tracker from correlating certain events. Lastly, some correlations may be so ambiguous that they can not be assigned to a single surface. In each of these cases, the local fabric provided by the surrounding, consistent surfaces may help to fix these problems. Miscorrelations may be corrected, poor correlations in noisy areas may become acceptable, or multiple correlations may be disambiguated. The consistent set of surfaces from step 43 may allow improvement of the seismic event tracking and, if desired, further passes through the workflow (indicated in FIG. 4 by the dashed iteration arrow) may be performed to fill in holes and create fewer, more extensive surfaces (i.e., an improved skeleton).

Figure 5A:
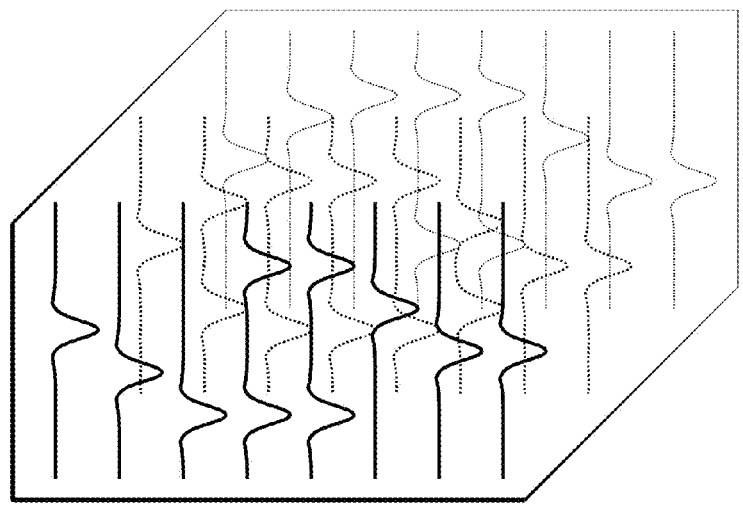
FIGS. 5A-D are schematic diagrams illustrating the steps in FIG. 4.
Figure 5B:
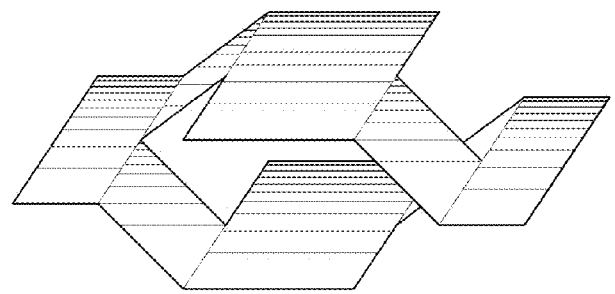
Figure 5C:
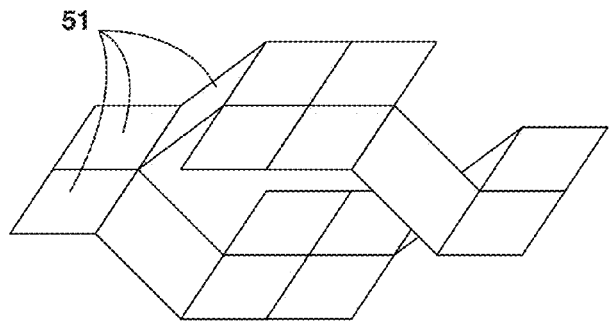
Figure 5D:
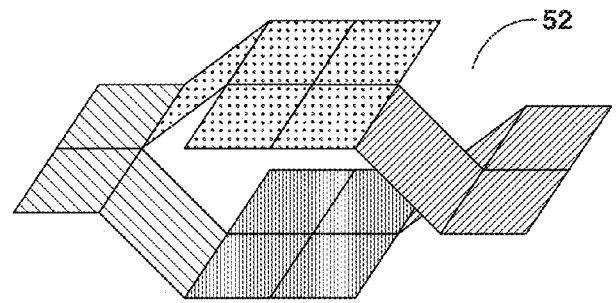

FIGS. 5A-5D are schematic diagrams illustrating the steps of FIG. 4. In FIG. 5A, peak events in a seismic data volume are tracked, and (FIG. 5B) found to form a multi-valued surface. FIG. 5C shows the surface broken into sixteen small patches 51 that are topologically consistent with each other. In FIG. 5D, neighboring patches are merged into larger ones unless this causes a topological inconsistency. The final result 52 is a set of four topologically consistent surfaces, each indicated by different cross-hatching.

Figure 6:
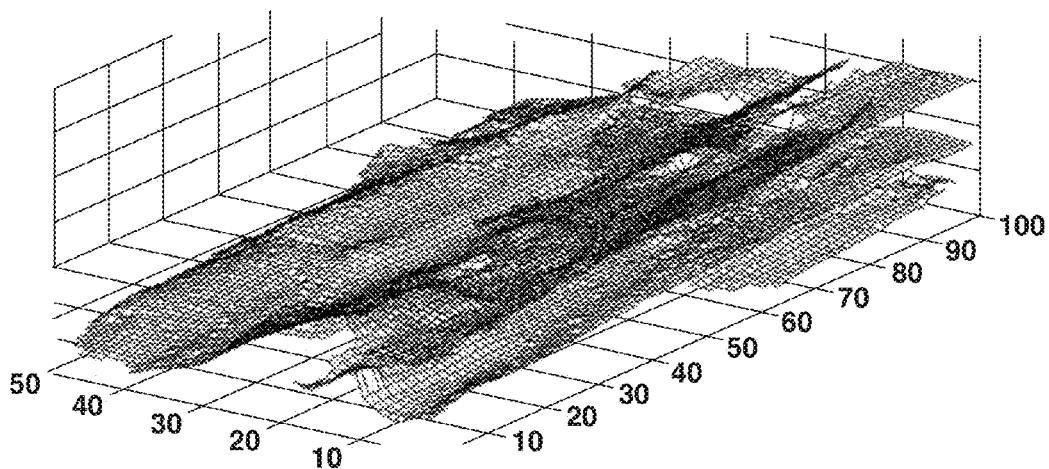
FIG. 6 shows a seismic reflection surface obtained by tracking a peak across neighboring traces.

FIG. 6 shows an example of a seismic reflection surface obtained by tracking a peak across neighboring traces. On the left, the surface is single valued, but on the right side, the surface is clearly multi-valued and overlays itself at least twice. Many existing seismic autotrackers either yield such multi-valued surfaces, or simply return one of the different possibilities for each location, typically the one found first, and thus not necessarily a geologically relevant one.

Figure 7:
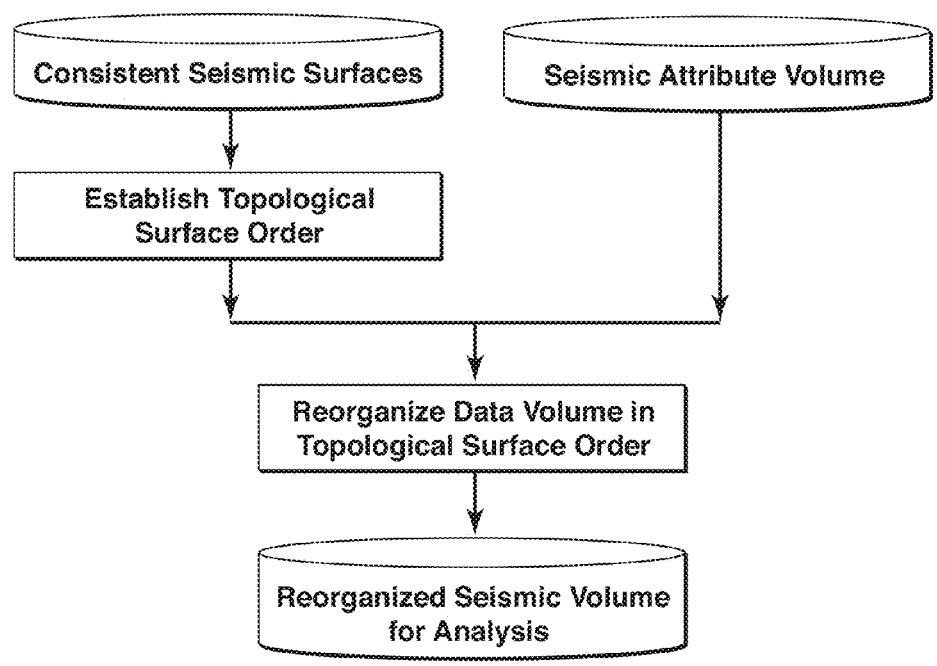
FIG. 7 shows method steps for using the consistent set of surfaces generated by one embodiment of the present inventive method to establish their overall order and reorganize the seismic data (within the data volume) into this order for use in interpretation.

FIG. 7 presents an application of the one embodiment of the present inventive method wherein a seismic attribute volume is reorganized using a topologically consistent set of surfaces, such as the present inventive method creates. Because the surfaces are consistent, there is at least one order which honors the individual above/below relations. If surfaces correspond to the boundaries between geologic strata, then such an order represents the sequence of their deposition. Typically, the order is non-unique because small features may be laterally disconnected without overlap, and thus their exact order cannot be established. Distorting the seismic data vertically (e.g., flattening the seismic surfaces) in such a way that the corresponding seismic surfaces are arranged in this order to allow the interpreter to analyze the seismic data in the order in which the geologic strata may have been deposited, which facilitates the exploration and production of hydrocarbons.

Figure 8:
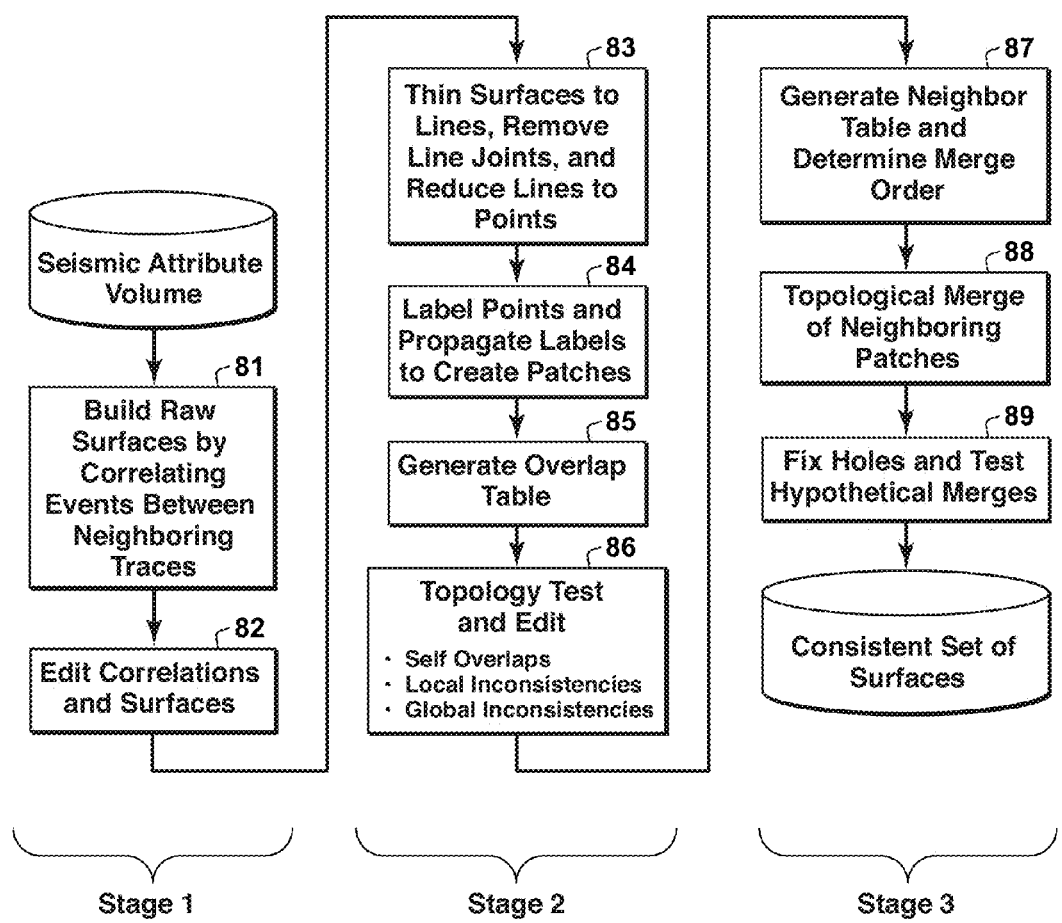
FIG. 8 is a flow chart showing basic steps in a particular embodiment of the method of FIG. 4.
Figure 9A:
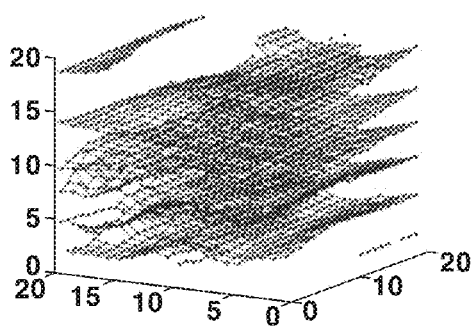
FIGS. 9A-9F illustrate an exemplary application of the flow chart of FIG. 8 of converting multi-valued surfaces to consistent surfaces.
Figure 9B:
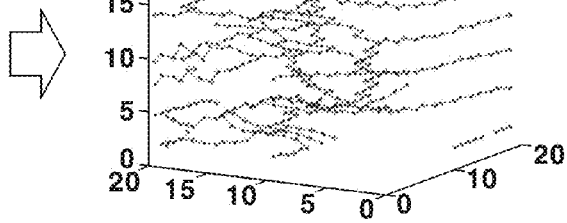
Figure 9D:
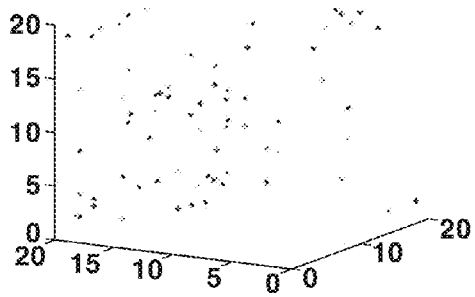
Figure 9C:
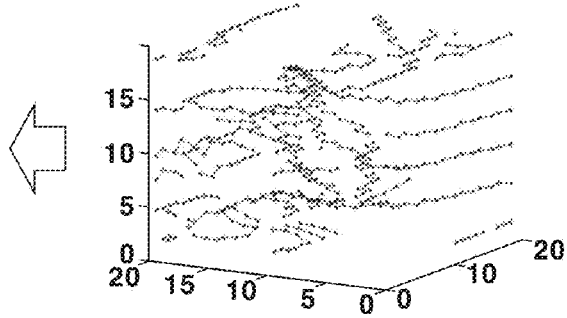
Figure 9E:
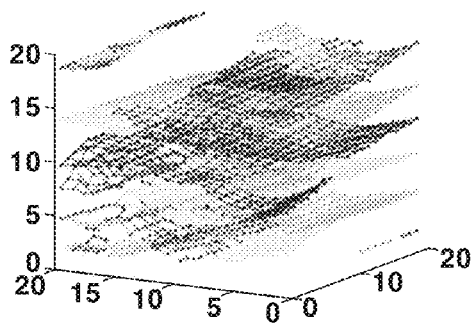
Figure 9F:
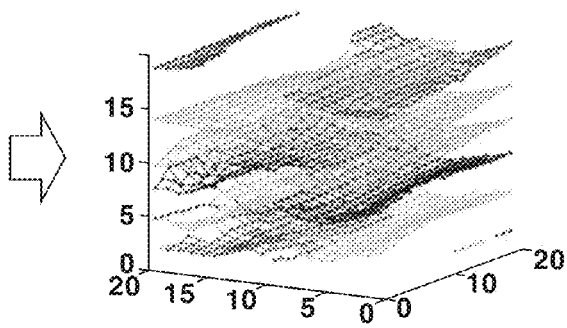

Next, the present inventive method is explained in more detail, as illustrated by a particular embodiment of the method of FIG. 4, which is illustrated in the flow chart of FIG. 8 and exemplary application of this flow chart in FIG. 9. In FIG. 8, "Stage 1" refers to step 41 of FIG. 4, "Stage 2" to step 42, and "Stage 3" to step 43. FIGS. 9A-9F illustrate an example application of the flow chart in FIG. 8 and may be best understood by concurrently viewing FIG. 8. In FIG. 9A, multi-valued surfaces are constructed by tracking seismic events (Stage 1). In Stage 2 (Step 42), the surfaces are reduced to lines (shown in FIG. 9B), line joints are removed (shown in FIG. 9C), and lines are reduced to characteristic points (shown in FIG. 9D). The remaining points are labeled and the labels are propagated back out onto the surfaces to construct the patches (shown in FIG. 9E). The resulting patches are topologically merged in Stage 3 of FIG. 8 (Step 43) resulting in consistent surfaces (shown in FIG. 9F).

Stage 1 (step 41)

the first part of step 81 is event tracking. In this embodiment of the invention, tracking of all events involves correlating neighboring events and editing gaps and miscorrelations. Correlation begins by extracting all the desired seismic events, or reflection surfaces, across all traces. Desired events might include peaks, troughs, or either kind of zero crossings (+/− or −/+). Experience has indicated that extracting both peaks and troughs (but not zero crossings) may be a good compromise between minimizing the total number of events (i.e., maximizing computational efficiency) and maximizing the quality of the resulting surfaces. Using more than one kind of event reduces ambiguity in event correlation and topological merge, because peaks, troughs and zero crossings are interspersed throughout the seismic data volume. FIG. 10A illustrates event tracking as performed in this embodiment of the invention. Shown at the left of the drawing, for each seismic trace, local minima are extracted to define troughs (dashed arrows), while local maxima define peaks (solid arrows). Seismic trace windows 101 indicated by brackets are centered on each event, and used for event correlation between different traces. The right-hand part of the drawing illustrates event window correlation between different traces, and thus construction of raw surfaces. A one-dimensional (pilot) packet of data 102 (centered at a peak, for example) is compared with other packets in neighboring traces. Some events exhibit great similarity and are uniquely correlated (solid line arrows). Other events might be well correlated with more than one event on a neighboring trace (103 arrows) and will be termed multiply correlated. Rather than choosing one valid correlation over the other, both correlations are thrown out (in this embodiment of the invention) after storing their location and properties for disambiguation after the topological merge or in a second pass through the workflow for example. Some correlations might be poor (104 arrows). Events with only poor correlations may be assigned to surfaces after the topological merge by considering their context and the surrounding local seismic fabric.

Inter-trace correlation can be measured mathematically with a number of methods, for example cross correlation or semblance analysis. A good correlation is preferably defined as one that exceeds a pre-defined threshold, whereas a poor correlation is one that does not. Additional criteria, such as the vertical distance (lag) between neighboring events, may also be used during the correlation process. If this lag exceeds a pre-defined threshold, then the two events most likely belong to different surfaces, and no connection is made (i.e., their correlation is rejected). Beneficially, this may be used to prevent cycle skips.

More generally, inter-trace correlation can be computed as the result of an inter-trace metric. This may consist of defining a function that computes the distance in a multidimensional vector space. For example, picking two windows centered at each of the two traces defines the multidimensional vector that consists of the values inside that window. These values may be the amplitudes recorded at each voxel or multiple features computed from those amplitudes (e.g., statistics such as the mean, variance and higher moments; a frequency decomposition through a Fourier transform; etc.). The function that compares the two vectors may be a Euclidean distance function, 1-norm, Hausdorff distance, etc.

In practice, two packets are often not connected directly, because their correlation is poor or their vertical difference exceeds a certain threshold. They may, however, be unambiguously connected in an indirect manner as illustrated in FIGS. 10B-10C. FIG. 10B shows a surface with a few missing connections. If not accounted for, such missing connections give rise to numerous unnecessary patches, which increase the computational cost of the topological merge. The gaps can be fixed, however, where connections are already implied. In one embodiment of the invention, when events can be uniquely connected, albeit in an indirect manner (i.e., without satisfying the correlation criteria discussed previously), direct connections are explicitly made to close the gaps and thus prevent the generation of unnecessary patches. This editing step (step 82) relies on the fact that circumventing a gap in one direction leads to the same point on the neighboring trace as circumventing it in another direction, indicating that the surface is locally simple and neither splitting nor spiraling. For example, consider the connecting paths 105 and 106 each going opposite ways around a gap in FIG. 10A. Paths 105 end up at the same place implying unique connections between that point and points en route. Those missing connections are shown by the two new cell boundary lines added in FIG. 10C (thicker lines). In contrast, paths 106 show that these missing connections are ambiguous, and thus no changes are made at that location in FIG. 10C.

Stage 2 (Step 42)

The second stage is the generation of topologically consistent patches. The raw surfaces obtained in Stage 1 by tracking reflection events defined by peaks, troughs, and/or zero crossings are typically not topologically consistent. They often 1) overlap themselves, 2) exist above another surface at one location, but below the same surface at different location (local inconsistency), or 3) are part of sets of surfaces that contain a loop in their above/below relations (global inconsistency). Many smaller patches are more likely to be topologically consistent than a few large ones. In fact, if all the patches were only one sample in areal extent, then by construction, they are topologically consistent. Thus, the objective of this stage is to break the raw, potentially multi-valued surfaces into smaller, topologically consistent patches. This is done (step 83) by first reducing (shrinking) the surfaces to topologically similar lines by application of a medial axes transformation or morphological thinning (for example see Haralick and Shapiro, *Computer and Robot Vision*, Vol. 1, Chapter 5, Addison-Wesley (1992)). Because the thinning is applied in the 4-connected sense, joints between line segments are characterized by having at least three direct neighbors. Removal of the joints, followed by a second application of morphological thinning, reduces (shrinks) the original raw surfaces to a few disconnected, characteristic points that are easily given unique identifiers, or labels. At step 84, the assigned labels are then propagated back onto the original surface, a process that might more descriptively be referred to as back-propagation, but may also be referred to for brevity as propagation.

Figure 11:
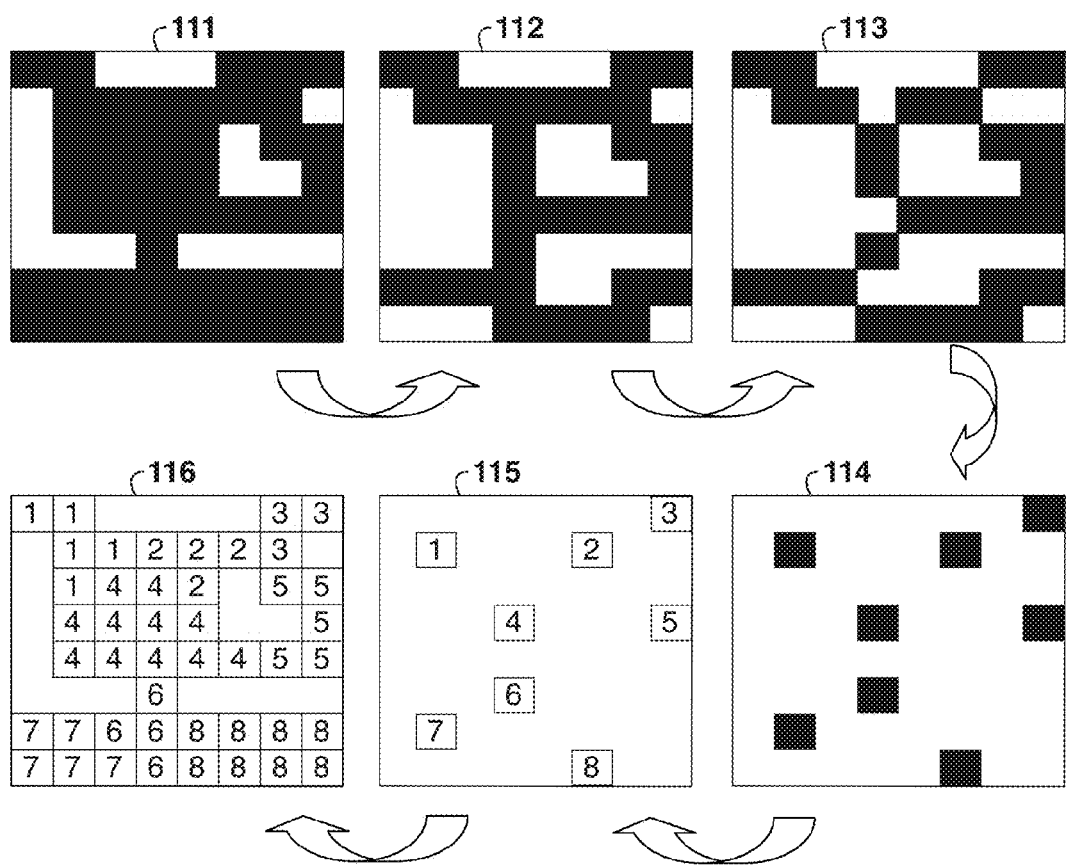
FIG. 11 illustrates the progression from a schematic raw, potentially multi-valued surface in map view to lines and then to characteristic points by shrinking (thinning); followed by point labeling and propagation of labels back onto the surface.

FIG. 11 shows the progression from a schematic multi-valued surface in map view (111) to lines by morphological thinning (112) and removal of line joints (113), from lines to points by morphological thinning (114), point labeling (115), and propagation of labels back onto the surface (116). The set of events with the same label define a patch. The result in FIG. 11 is a set of eight small patches in step 116, corresponding to the eight characteristic points in step 115. By construction, patches are equal to or smaller than their parent surface, because each characteristic point competes with nearby characteristic points for connected members. The back-propagation of labels can be preformed, for example, with a simple wildfire algorithm or with a controlled marching algorithm that is guided by, for example, event correlations, the lags (vertical proximity of events), or the local curvature of the surfaces. An advantage of controlled marching, versus a simple wildfire algorithm, is that it could propagate labels more rapidly across flatter regions, while moving more slowly across complex areas, thereby yielding more homogeneous patches. Other methods of propagation can be envisioned, which are within the scope of the present inventive method.

After propagating labels, the resulting patches, although generally consistent, are not guaranteed to be topologically consistent. To better perform the topological merge in Stage 3, these patches are preferably adjusted to be topologically consistent. A preferred way for identifying topological inconsistencies is to begin by constructing an overlap table (step 85) to record which patches overlay others and the manner in which they overlap. At step 86, the inconsistencies are identified. During table construction or later inspection, the self-overlapping surfaces are readily evident. From the table, pairs of patches with conflicting above-below relationships (i.e., local inconsistencies) are identified. Lastly, one can find sets of three or more patches for which the above-below relationships are circular (global inconsistencies) by attempting a topological sort of the remaining entries in the overlap table. The topological sort succeeds if no circular relationships exist. If such global inconsistencies exist, then the topological sort is impossible and instead returns a list of patches with inconsistent relationships.

The last part of step 86 is editing the identified topologically inconsistent patches. The simplest editing method is deletion of inconsistent patches. A more surgical approach is to prune these patches by removing the origins of the conflicting overlaps only. This approach requires some diligence, because some patches may become disconnected by this process and may require re-labeling of the resulting pieces. Another editing method may be to iteratively split the inconsistent patches into smaller ones until all inconsistencies are resolved. In practice, simple deletion of inconsistent patches seems to work well, because there are far more consistent patches than inconsistent ones, and those that are inconsistent are generally far smaller and often located in marginal areas. After editing inconsistent surface patches, it is preferable to reconstruct the overlap table to account for these editorial changes.

Stage 3 (Step 43)

The third stage involves merging neighboring patches into larger ones, under the condition that the merged surfaces remain topologically consistent. The first task is to determine which patches are connected (i.e. abut each other in some manner in the data volume, but are labeled differently). These patches are termed neighbors, and may be recorded (step 87) in a neighbor table as candidates for topological merge into larger patches, ultimately resulting in a surface. For example, separate patches are created by thinning (e.g., reduction, shrinking) and reduce to different characteristic points. If the surface is a perfect rectangle, with perfect connections in all directions within the rectangle, then the thinning likely yields five characteristic points, and thus five patches after propagation. Just because they are different patches does not imply that they do not connect to each other with good correlations. Most patches being merged were once part of a well-correlated surface. Typically, there are many patches and many pairs of neighbors. The number, shape, and quality of the resulting topologically consistent surfaces depend on the order in which the merge candidates are evaluated. Take, for example, two patches that overlap, and a third patch that neighbors both. It cannot be merged with both, because the resulting merged surface self overlaps. As such, it can be merged with only one. The particular choice dictates the success or failure of subsequent merges. Continuing step 87, the neighbor pairs in the neighbor table are preferably put into an order in which the merge attempts are performed. A trivial order is simply one of numerically increasing labels (i.e., the order in which neighbors were encountered). More sophisticated orderings might incorporate patch properties, such as the correlation coefficient between events in neighboring patches or similarity between patch orientations. The latter is a preferred method to establish the merge order. Neighboring patches that are oriented similarly are merged first, because they are more likely to represent common geologic strata, whereas neighboring patches with greatly dissimilar orientations are merged last, because they could be related to noise artifacts or non-stratigraphic events, such as faults and fluid contacts. Even more advanced orderings could be based on the statistical similarity between secondary seismic attributes extracted at or near the patch locations.

With a merge order established by one method or another, the topological merge may be undertaken (step 88). The process for one embodiment of the invention is outlined in detail in the flow chart of FIG. 12A and described next; a second embodiment is described in FIG. 12B and is described further below. At step 121, one pair of neighboring patches is selected as merge candidates, and is postulated to constitute or be part of one surface, meaning that the overlap relations for one patch are applicable to the other (and vice versa). If this action generates a topological inconsistency, then the merge must be rejected. Otherwise, the merge is accepted, and the overlap and neighbor tables are adjusted by replacing the label for one patch with that of the other.

Figure 12A:
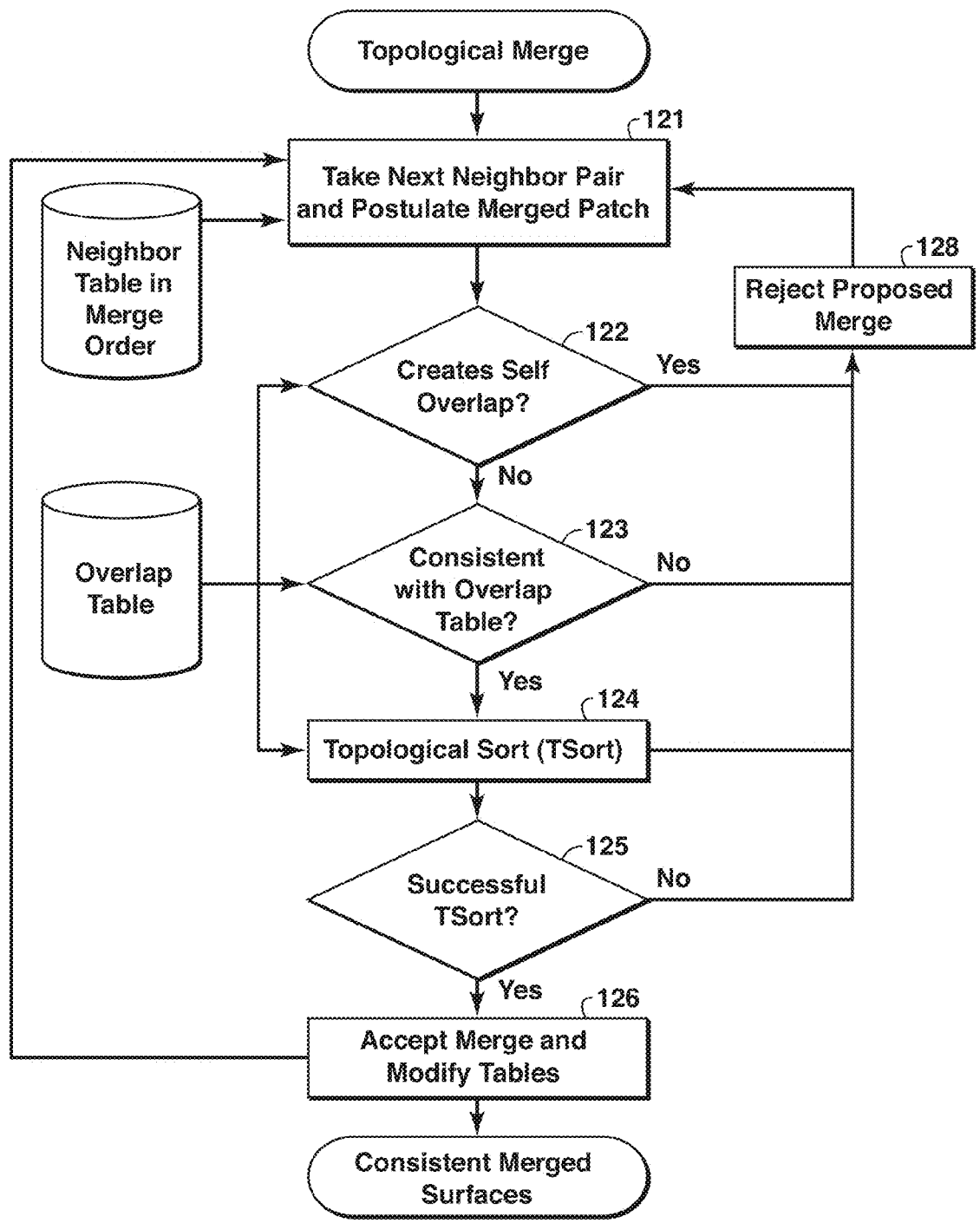
FIG. 12A is a flow chart showing basic steps for topologically merging pairs of neighboring patches in one embodiment of the inventive method.

The computational costs to evaluate the three consistency conditions after a postulated merge are very different. Self overlap is quick and easy to verify. This is shown as step 122 in FIG. 12A. A local consistency check requires examination of the entire overlap table (step 123). A global consistency check, however, requires a topological sort (step 124), which is computationally expensive. In the embodiment of FIG. 12A, the three consistency checks are cascaded in order of increasing numerical costs. The more expensive checks are performed only on merge candidates that pass the less costly checks.

If the topological sort succeeds (step 125), then the merged patch is globally consistent, and thus, topologically consistent. The hypothesis is then accepted, and the tables are accordingly modified (step 126). Then, the procedure repeats (step 121) with the next pair of merge candidates. If the sort or any of the other tests fail, then (step 128) the hypothesis is rejected, and the procedure is applied to the next pair (step 121).

Even cascading the three consistency checks is computationally costly, because the topological sort needs to be executed many times. The topological patch merge algorithm could be sped up dramatically were the topological sort not performed for every pair of neighboring patches. One modification of the algorithm is the introduction of a queue. Neighbor pairs that passed the first and the second test (steps 122 and 123) are placed in a queue instead of immediately being evaluated by the third test (step 124). Once the queue reaches a user-specified size, for example four pairs, the overlap table is duplicated, all the proposed merges are applied to the copy, and the topological sort is executed. If the sort succeeds, then all four proposed merges are globally consistent and acceptable. If the sort fails, then there must be at least one inconsistency in the proposed merges. To find the inconsistency, the original overlap table is copied again, but only the first two merges are applied to the copy. The remaining pairs are simply stored in a holding queue. If the sort succeeds, then the merges of the first two pairs are acceptable and it is known that there is an inconsistency in the later two pairs. If the sort fails, it is known that there is an inconsistency in the first two pairs. The procedure is repeated again on the set containing the inconsistency, but this time only one pair is evaluated. After the topological sort, it is immediately known which potential pair led to an inconsistency and should be rejected. At this time, the cycle repeats by refilling the queue before the sorts are performed again.

In other words, after discovering an inconsistency in the proposed merges accumulated in the queue, the queue is bisected and sorts are performed on the pieces until the inconsistency is found, while accepting successful merges. Generally, the queue should not be limited to four pairs, but instead to a few hundred or thousand pairs. Moreover, the queue size can be allowed to vary dynamically. If the sort fails, the queue size is reduced, but if it succeeds, then the queue size is increased for the next evaluation of the topological sort. Finding one inconsistency among N pairs can be performed with $\log_2 N$ sorts instead of N sorts. For a queue with one thousand twenty four elements, one inconsistency can be found in at most ten topological sorts, which results in a great reduction in computational costs.

Figure 12B:
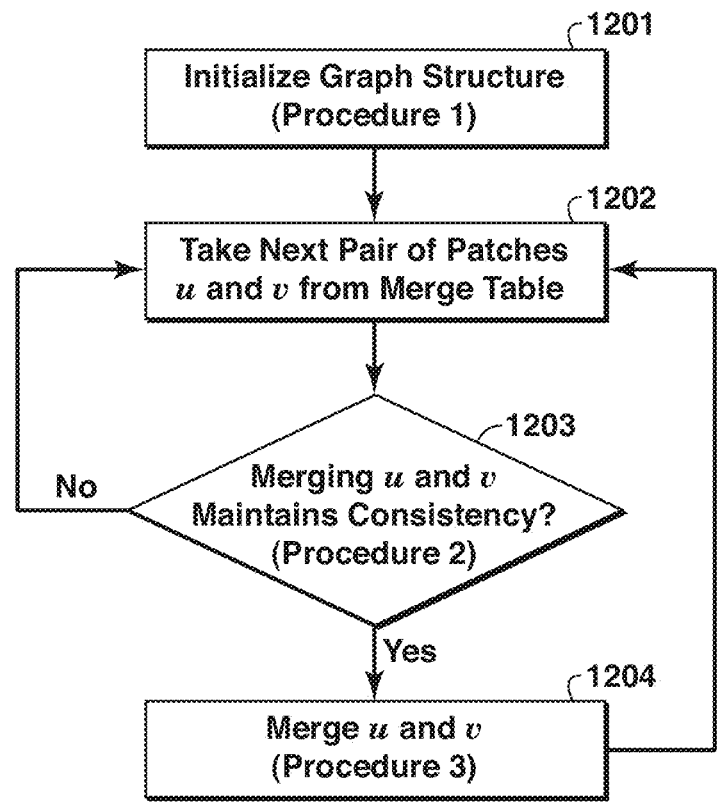
FIG. 12B is a flow chart showing basic steps for topologically merging pairs of neighboring patches in another embodiment of the inventive method.

A second embodiment of the topological merge is shown in FIG. 12B with details presented in Table 1. This alternative embodiment of the invention differs from the previous one in the way in which the consistency check is performed. The first approach checks whether a directed cycle is introduced after merging two surface patches. By contrast, the alternative embodiment predicts whether a merge would create a directed cycle instead of checking for cycles. This is a much less computationally intensive task that not only performs the same function, but is also more robust. The inputs to the method of FIG. 12B are initial patches, their ordering (acyclic directed graph), and a merge order table (pairs of neighboring patches). The output is larger patches, and ultimately surfaces.

A cycle (i.e. a topological inconsistency) is created after merging two surface patches only if one patch is above the other. Therefore, in order to avoid introducing inconsistencies, it suffices to check whether one patch is above the other. The data structure that provides a convenient representation of such relationships is a kind of directed graph: the surface patches inside the volume are represented by nodes, and directional connections, or edges, between nodes exist if one patch is above another. Thus, the problem reduces to a specific graph traversal problem in which the question is whether a path between two nodes (the surface patches) exists.

The graph traversal problem can be solved using the standard depth-first search (DFS) algorithm (e.g., see *Introduction to Algorithms*, Cormen, Leiserson and Riverst, MIT Press and McGraw Hill, 477-485 (section 23.3, "Depth-first search") (1990)). Implementation of the following modifications to this general algorithm achieves a substantially better computational efficiency. First, augment the data structure, the directed graph, with an additional attribute at each node, u, denoted DEPTHATT(u), that keeps track of the absolute depth of the patch. Second, introduce a Geometric Depth Property (GDP) and modify the traversal algorithm so that it ensures that the GDP is both maintained and exploited at all times (Step 1201 in FIG. 12B and Procedure 1 in Table 1). This property (GDP) requires that the depth attribute increase monotonically when following the directed edges in the graph. In other words, if patch a overlaps patch b in the volume then the depth attribute of patch a must be less than or equal to the depth attribute of patch b. Then, in step 1202, a pair of patches is selected from the merge table, and at step 1203 merger of the two selected patches is checked for topological consistency employing the GDP to gain efficiency (Procedure 2 in Table 1). If the check is affirmative, then in step 1204 the two patches are merged according to Procedure 3 of Table 1. This approach is efficient because the search for a path between two nodes is confined to a small portion of the graph instead of the whole structure: the surface patches to be merged have depth attribute values within a limited range of values, and the search only explores nodes with depth attributes within that range. The GDP guarantees this to be sufficient.

TABLE 1

Geometric Depth Property (GDP)
Let u ≠ v. DEPTHATT(v) ≦ DEPTHATT(v) if there is a
directed path starting at node u that reaches node v.

Procedure 1: Enforce GDP on an acyclic directed graph

1. Assign DEPTHATT(u) to each node u by taking highest depth value of patch u.
2. For each node u with no incoming edges:
   (a) For each child v:
     i. If DEPTHATT(u) > DEPTHATT(v), then DEPHTATT(u) = DEPTHATT(v)
     ii. Mark u as visited.
     iii. If v is unvisited, then repeat Step 2 on v as well.

Procedure 2: Check consistency if nodes u and v were to be merged

1. Set maxdepth=max(DEPTHATT(u), DEPTHATT(v))
2. Start at u and recursively follow edges to nodes for which DEPTHATT ≦ maxdepth.
   (a) If v is encountered, then cannot merge u and v.
3. Start at v and recursively follow edges to nodes for which DEPTHATT ≦ maxdepth.
   (a) If u is encountered, then cannot merge u and v.

Procedure 3: Merge nodes u to v

1. Add edges of v to u.
2. Set maxdepth=max(DEPTHATT(u), DEPTHATT(v)).
3. Set DEPTHATT(u)=maxdepth
4. Remove node v
5. Apply Step 2 of Procedure 1 to the modified node u (this step maintains the GDP)

Note:
The graph traversals in procedures 1 and 2 may follow any scheme, such as a modified depth-first search. Only the modification is detailed here.

Further efficiency gains may be obtained by appropriately ordering the merge table. For example, the algorithm tends to work more efficiently if the order of merges gives preference to those pairs of patches that have a high depth value first. Reordering the merge table in this fashion may improve efficiency. In addition, breaking down the order of patch merges according to region-based schemes can have a significant impact. For example, the volume may be divided into regions of space that do not overlap but that taken together cover the whole space. Label these regions from 1 to n and list them in some order according to a permutation of the n labels. Now perform the merges that fall in the first region listed, then those in the second region listed, and so on. The way in which the regions are chosen, and the permutation of their listing can greatly diminish the computation time. For example, breaking the volume along one of the axes into n slabs and listing the regions so that any subsequent region is most distant from the previously listed regions can significantly decrease computation time. This scheme also lends itself to parallelization—the computation can be performed by different processors or computers at the same time, so long as the regions are not connected to the previous ones. The extreme case of this scheme is to begin with surface patches that are a single voxel in size.

The algorithm described above and outlined in FIG. 12B and Table 1 can readily be parallelized, and additional elements can further enhance such an effort. Specifically, if an external structure keeps track of the connected components of the directed graph, then both the decisions of what can be computed in parallel and the speed of execution may be improved. For example, suppose that the pair of surface patches to be merged is such that one patch is in component A and the other patch is in component B. Since the two components are different and no connection exists between them, there cannot be a path between the two patches. Therefore, a merge is acceptable, and no further inspection of the graph is needed. However, if the two components were connected, then the graph may have to be searched as before. The decision on whether to inspect the graph or not can depend on how the two components are connected. If the two components connect only at a depth level that is below the lowest depth level of the two surface patches, then no path can exist between them and no further search is needed. If that is not the case, then the graph must be inspected. Therefore maintaining an additional structure that keeps track of the connected components of the graph and the highest depth value at which there is a connection between any pair of components can further increase the computational efficiency of the algorithm. All such efficiency improvements are within the scope of the present invention.

Figure 13:
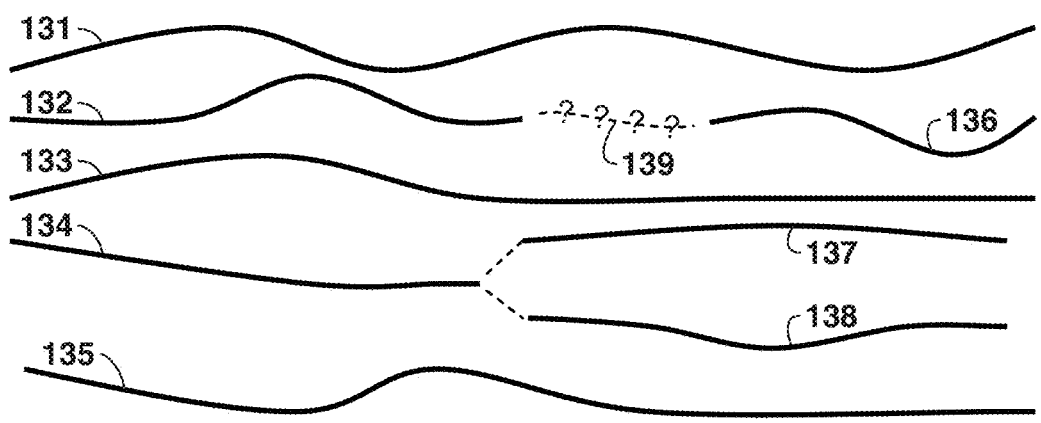
FIG. 13 illustrates holes caused by low correlations between events or the existence of multiple good, but ambiguous connections, both of which can be fixed in an editing step.

The last step in Stage 3 is step 89, an optional step for fixing holes caused by low correlations between events or the existence of multiple good but ambiguous connections. Some surfaces contain obvious holes that can be fixed by analogy with surrounding surfaces. Additional patches may be merged by trial and error. One example of a testable hypothesis involving the topology relates to unassigned events or gaps between surfaces. First, the gap is assigned to a new patch. Similar gaps in neighboring traces are assigned the same patch label even if their correlations are weak or ambiguous. This new patch is accepted as an acceptable patch if it is verified as being topologically consistent by neither overlapping itself nor causing a local or global inconsistency. A topological merge is then attempted to fuse this new patch with one or more of its neighbors, potentially linking up neighboring patches that were not directly connected and thus reducing the skeleton by replacement of multiple small surfaces with one larger one. The top portion of FIG. 13 shows an example of some uncorrelated surfaces (e.g., surface 139) sandwiched between two surfaces (surfaces 131 and 133). These events were either not correlated because their cross correlation was below the correlation criteria, or because their correlations were ambiguous. From the overall fabric revealed by the skeletonization, it appears possible that (1) all these uncorrelated events form a consistent patch, and (2) that this patch could be merged with one of the surfaces to either side (132 and 136) or even linking them.

Another approach to exploit the seismic skeleton is to resolve which of the two split surfaces, such as surfaces 137 and 138, continues the original surface 134. At such a previously unresolved surface split, one strategy is to attempt to merge the surfaces either way. If only one merge succeeds, it is tentatively accepted, and thus this solution is found. If either none or both of the merges succeed, however, then this strategy cannot resolve which of the two surfaces continues the original one. The bottom of FIG. 13 shows an example of one surface 134 that splits into two surfaces 137 and 138. The three dimensional information available for the topological patch merge does not resolve the question of which of the two surfaces is the continuation of the single one. If it had, the patches are merged because there is a unique path of correlations through the third dimension linking the patches. Here, the overlap tables and the topological sort can be used to test some of these hypotheses, and if validated, use them to fix and further simplify the skeleton.

Remaining small holes in surfaces may be a nuisance for later seismic interpretation steps, and are often fixed by interpolation. The validity of these interpolations can be tested by checking whether the modified surface remains topologically consistent.

Figure 14:
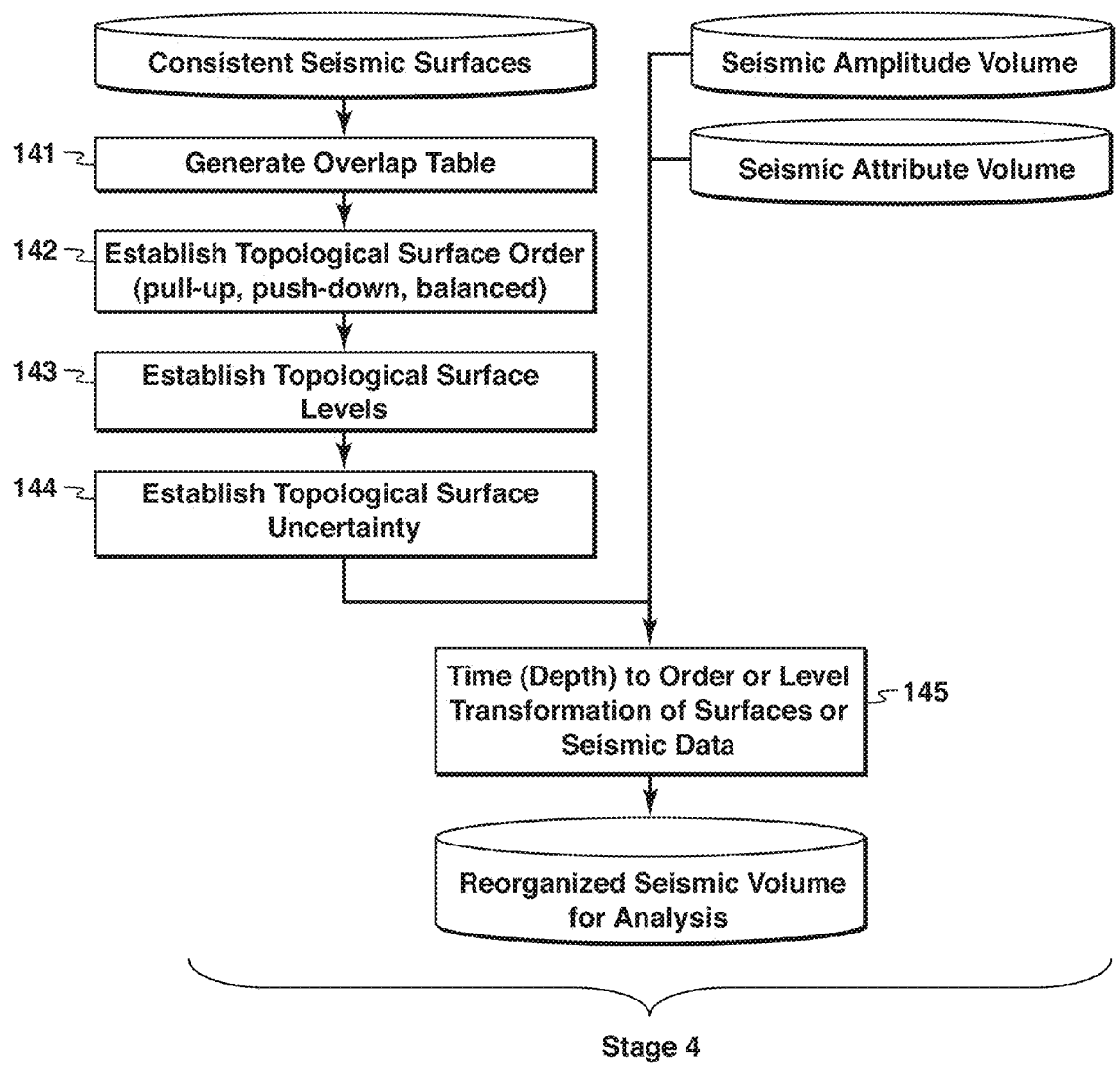
FIG. 14 is a flow chart of basic steps for transforming the time/depth vertical scale of the seismic data volume to an inferred level order of stratigraphic placement and deposition.

FIG. 14 is a flow chart of basic steps in a Stage 4 that can optionally be added to the method of FIG. 8. In the optional Stage 4, the overlap table for a select set of consistent surfaces is retrieved, or recreated if necessary. At step 142, a topological sort is performed to find an order in which the surfaces could be arranged, while honoring the above/below relations encoded in the overlap table. Because many surfaces have a limited areal extent, and thus limited overlap, there are not enough relations to enforce a unique arrangement. Instead, there are multiple arrangements that all satisfy the overlap relations. Moreover, the topological sort algorithm can be implemented using a variety of strategies, including a pull-up, push-down, or balanced strategy. Surfaces are placed as high up as possible with the pull-up strategy which implies that the order marks the last possible moment a given strata could have been deposited relative to the surrounding ones. With the push-down strategy, surfaces are placed as far down as possible which implies that the order marks the earliest possible moment a given strata could have been placed relative to the surrounding ones. The balanced strategy tries to place surfaces in the middle of their range. These strategies determine the order in which the overlap relations are selected and updated inside the topological sort algorithm. In each strategy, the result is an order or hierarchy that can be used to arrange the surfaces, the seismic reflections, or the entire seismic data volume.

Because small surfaces are especially difficult to constrain, they tend to have higher variability when applying different strategies. Inclusion of all small surfaces in the transform also introduces distortion artifacts on the reorganized seismic data volume. Instead it is preferable to compute another measure upon which to base this transform. This measure is the level of a surface within the topological hierarchy. That is, determine how far down from the top is a particular surface is located. (Step 143) Specifically, one measure of this is to find the longest possible path in terms of number of overlap pairs encountered when traversing from the top down to the surface. Because the surfaces are consistent, there cannot be any loops and the existence of a longest path is guaranteed. A preferred method for finding these longest paths is a Bellman-Ford (BF) algorithm (R. Bellman, "On routing problems," *Quarterly of Applied Mathematics* 16, 87-90 (1958)) with negative unit weights operating on the overlap table. Negating the resulting distance yields the level of each surface within the hierarchy. Note that both order and level allow definition of a transform that deforms the vertical axis of the seismic data and corresponding surfaces. The result is a seismic dataset organized in the order of stratigraphic placement and deposition, which can be analyzed for the exploration, delineation, and production of hydrocarbons.

The level may be defined as the longest path in terms of maximum number of overlap pairs encountered when traversing from the top down. Alternatively, it can be defined as the longest path when going from the bottom up. Comparing such alternatives allows an estimate of how constrained the levels of the individual surfaces are, or conversely, how uncertain the levels are. (Step 144) To compare the two results, one needs to compensate for the different directions, and rescale the bottom-up measure linearly in such a way that the top surface has level zero and the bottom surface has the same level as for the top-down measure. For a given surface, the difference between its two kinds of levels is a measure of its uncertainty with regard to the topological order. A well constrained surface is at a similar level regardless of the sort strategy. Such a surface has minimal uncertainty with regard to its place within the topology. A poorly constrained surface may end up at a shallow level with the top-down measure, but at a deep level when using the bottom-up strategy. Thus, the level numbers differ greatly, and its place in the topology is highly uncertain.

Figure 15:
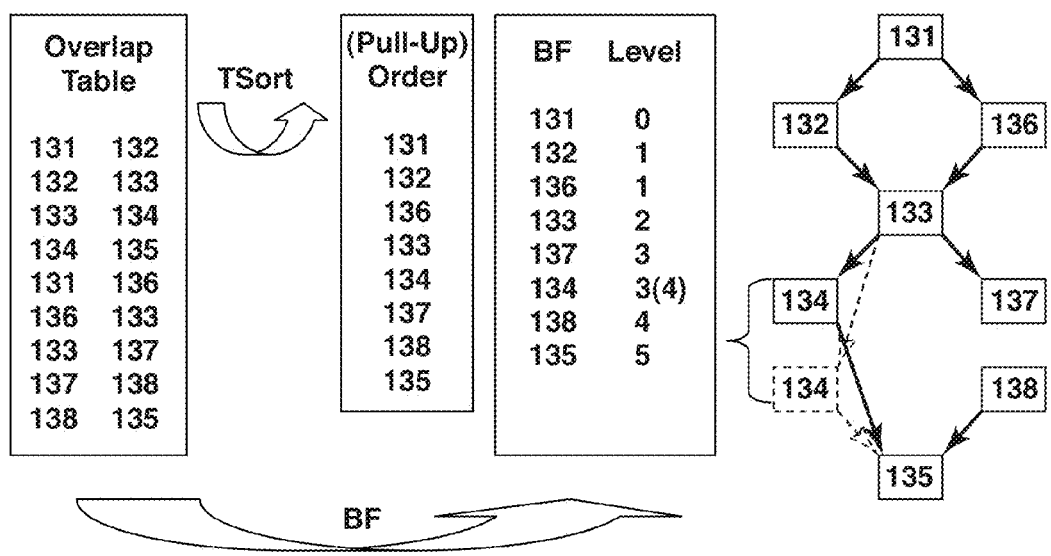
FIG. 15 shows an example of the topological orders and levels based on surfaces of FIG. 13.

FIG. 15 illustrates topological orders and levels, using the events shown in FIG. 13 as an example. The overlap table contains the above/below relations for the surfaces in FIG. 13. Performing a topological sort with the pull-up strategy yields an order that honors each relation in the overlap table. However, the topological sort order distorts a visualization of the surfaces by spreading them out vertically. A preferred alternative is to count the maximum number of surfaces that have to be penetrated to reach a given surface which can be done by applying the Bellman-Ford (BF) algorithm with weight −1 to the overlap table. The results are the BF levels, which assign surfaces 132 and 136 both to level 1. A graph (or tree) of the surfaces with the vertical position corresponding to the levels and their overlap relations is shown on the right hand side of FIG. 15, and provides an efficient way to summarize the surface relationships. Surface 134 is uncertain with regard to its level, and thus is shown in both its potential positions (levels 3 and 4).

Figure 16A:
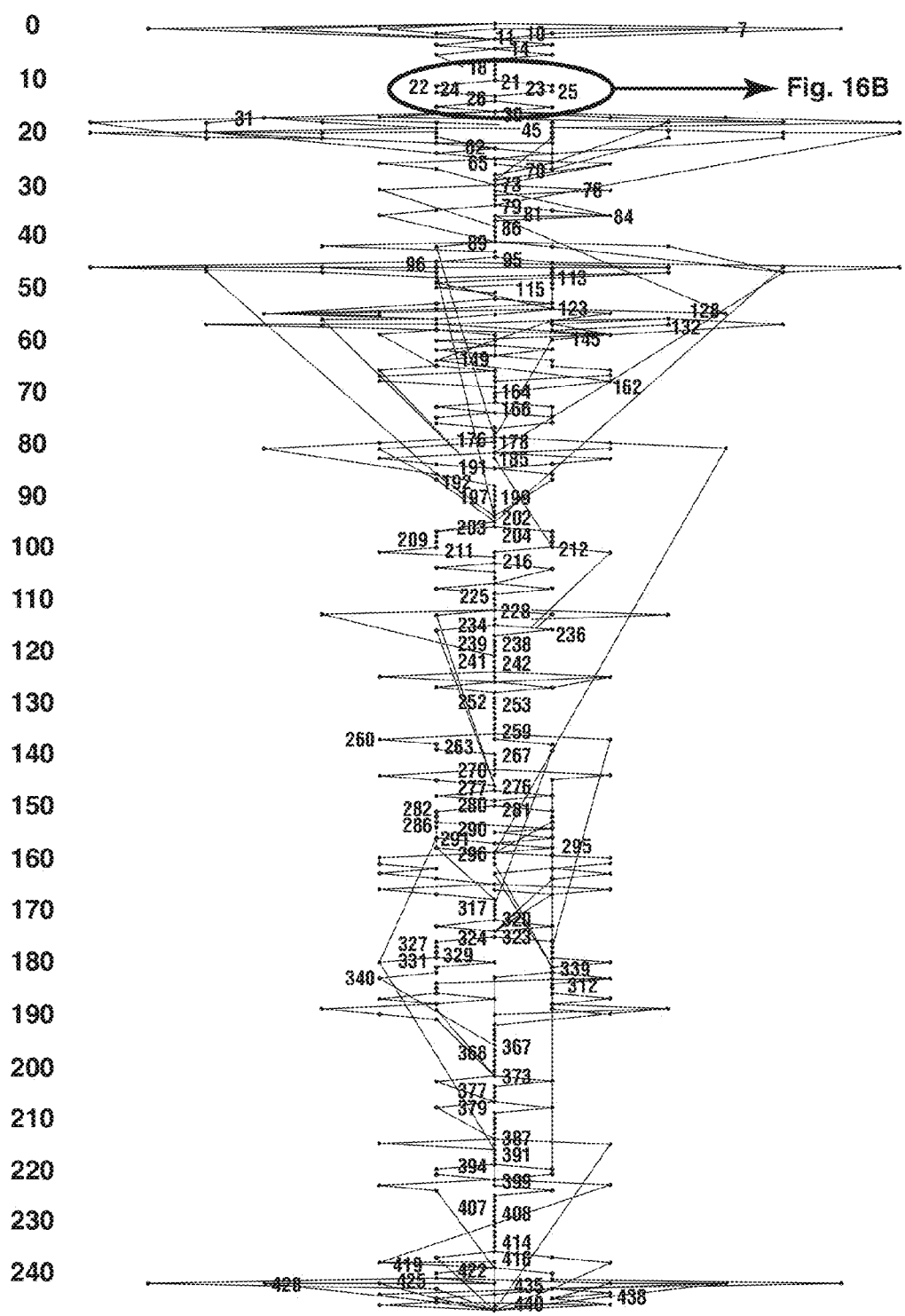
FIG. 16A shows a surface level tree for four hundred fifty surfaces of the data volume of FIG. 2.

The graph of surface labels (or tree) is an efficient way of summarizing all these data where the vertical position of a surface is determined by its level. The lateral position is arbitrary and could be chosen, for example, in accordance with the real position or simply so as to make the graph less cluttered. The different surface labels are connected by arrows to indicate the above/below relations. To encode even more information, large, and thus relevant surfaces may be represented with larger labels. FIG. 16A shows such a tree for the four hundred fifty surfaces of FIG. 2. The graph presents the surface levels, their above/below relations as extracted from the seismic data, and their areal extent indicated by the label size. Altogether, there are two hundred fifty levels, some of which are occupied by many small surfaces, while others are occupied by just one or two large surfaces.

Figure 16B:
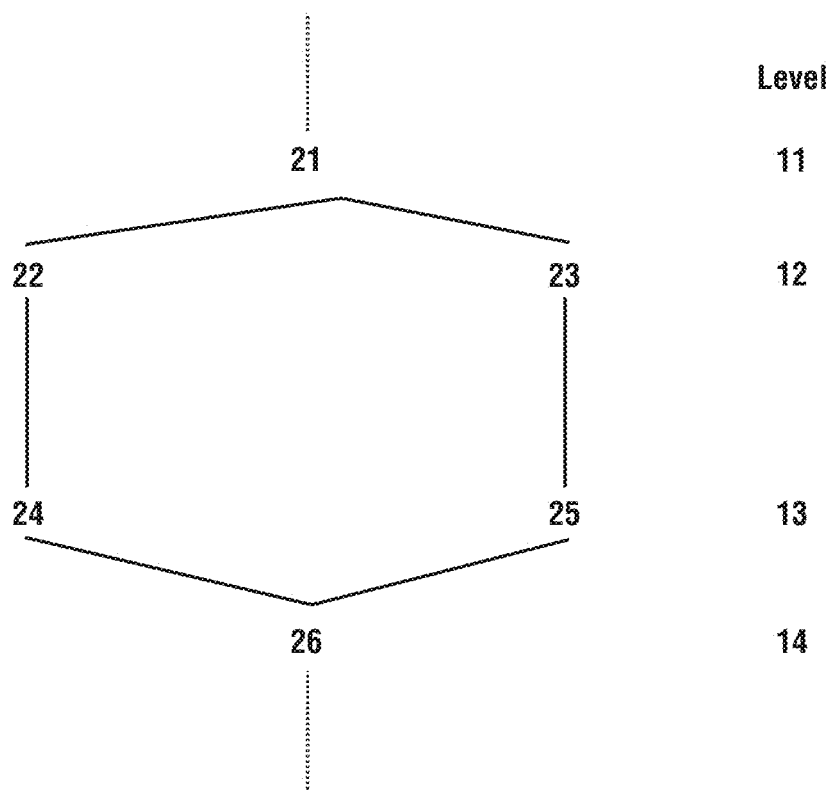
FIG. 16B shows a magnified view of a four-level portion of the tree.
Figure 16C:
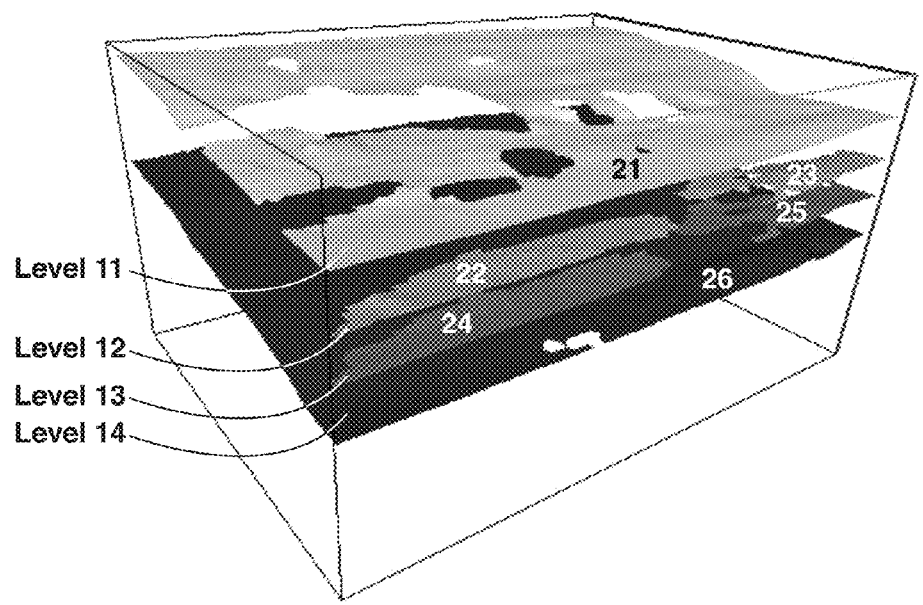
FIG. 16C shows all the surfaces of FIG. 2 associated with the four consecutive levels.

The graph (or tree) may be used as an aid to select surfaces for further analysis or visualization. Depending on the size of the data volume, the present inventive method may generate many thousands of surfaces, quickly overwhelming the interpreter during visualization. One procedure for dealing with this is to select surfaces along lines emanating from one reference node of the tree to allow visualization of surfaces overlapping only the reference surface, suppressing all others and decluttering the display. Another procedure chooses surfaces from one level only to allow visualization of surfaces that may be genetically related because they are located at the same level within the geologic strata. Yet another procedure chooses surfaces from an interval of consecutive levels to allow visualization of a stratal sequence. FIGS. 16B and 16C present an example where four subsequent levels 11-14 were selected from the tree for visualization. Levels 11 and 14 each contain one surface, while levels 12 and 13 each contain two surfaces. The two different groups of surfaces are likely to be genetically related because they are at the same levels within the sequence of strata.

Figure 17:
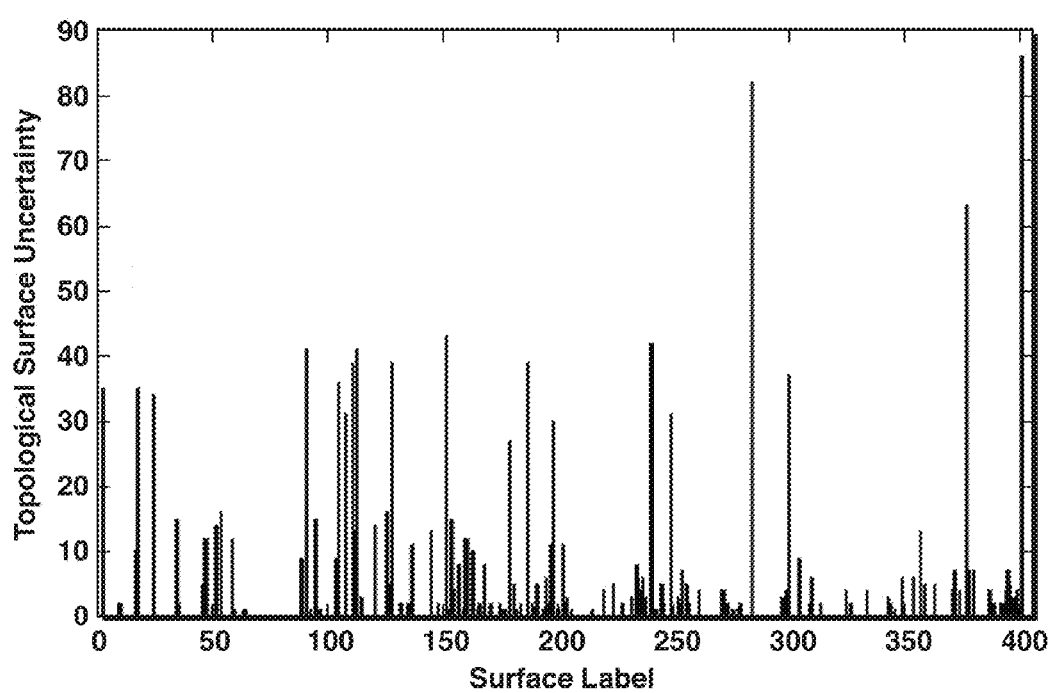
FIG. 17 is a graph showing the topological uncertainty for the surfaces in the surface level tree of FIG. 16A.

FIG. 17 is a graph that shows the topological uncertainty for the surfaces of FIG. 2. Most of the four hundred fifty surfaces are tightly constrained and cannot be moved more than a few levels without violating the conditions or constraints contained in the overlap table. Some surfaces, however, could be shifted more than ten levels while still honoring the constraints. These surfaces have a high uncertainty with regard to their relative time of deposition.

Once the order or levels are established, it is straightforward to reorganize the surfaces in this manner. Individual surfaces are characterized by sets of three-dimensional points (x,y,t) or (x,y,z) depending on whether the seismic data are expressed in terms of geophysical time or depth. For the sake of simplicity, it is assumed that the data are in the geophysical time domain. The depth case follows by analogy. Transforming the surfaces from the time domain to either the order or level domain (step 145) simply requires substituting time with order or level number.

Figure 18:
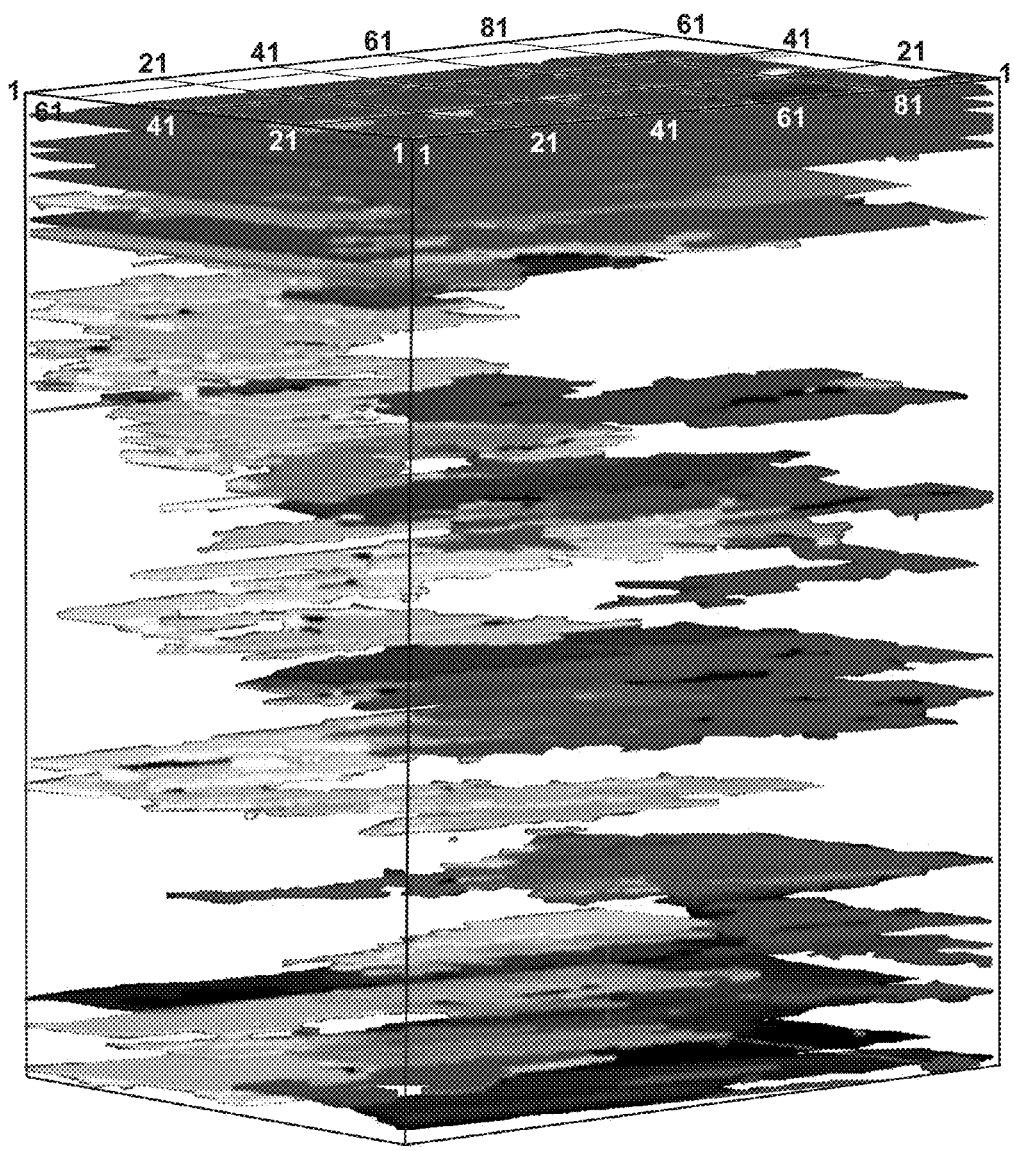
FIG. 18 shows the data volume of FIG. 2 after its surfaces are identified by the present inventive method then converted from the geophysical time domain to the (topological) level domain.

FIG. 18 shows the surfaces of FIG. 2 converted (transformed) from the geophysical time domain to the (topological) level domain. Each surface was replotted after substituting its geophysical two-way travel times with its level number, which flattens the surfaces (an application sometimes called volume flattening). The drawing shows that the surfaces are highly organized. The deposition of the geologic strata appears to have waned back and forth, left and right about four times in a rather systematic manner.

Transforming seismic volumes to the level or order domain instead of surfaces may require nonlinear stretching and squeezing of the seismic data to make them fit into the allocated intervals. For amplitude data, seismic wiggles may be compressed tightly or expanded to resemble higher or lower frequency data. The same situation exists for seismic attributes, but may not be as obvious as for amplitude data.

An alternative method to transform seismic volumes is to cut and paste packets of seismic data without deformation onto the framework conceptually provided by the domain transformed surfaces. The packet size may depend on the definition of the events used to build the surfaces. If the surfaces were built from peaks only, then a packet includes an entire wavelet with the peak and half a trough on either side. If the surfaces are built from peaks and troughs, then the packets are the peaks and troughs bounded by the zero crossings. If the seismic data to be transformed by the cut-and-paste method is not the original amplitude data, then the packet boundaries, for example the zero crossings, may also be determined from the amplitude data.

Figure 19:
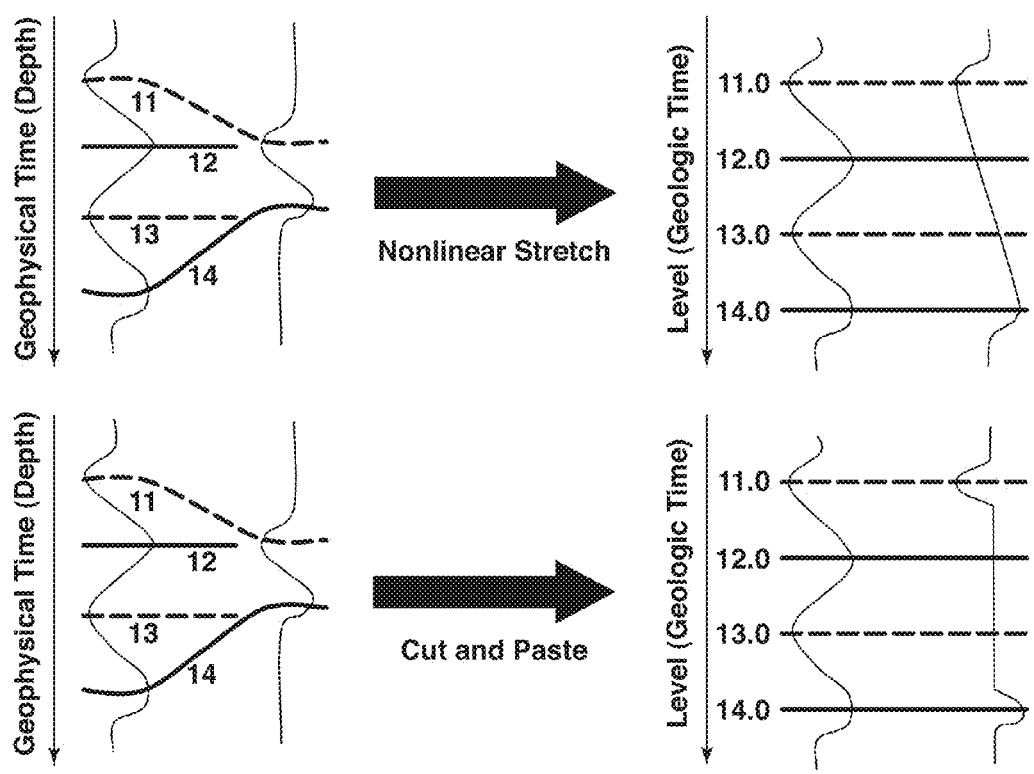
FIG. 19 illustrates methods for transforming seismic volumes into the level or order domain.

FIG. 19 illustrates these two methods to transform seismic volumes into the level or order domain. The nonlinear stretch method stretches and squeezes the seismic data to fit into the allocated intervals. On the right trace, the surfaces of levels 12 and 13 do not exist, but nevertheless, the nonlinear stretch interpolates them through the wavelet and assign parts of the trace belonging to surfaces with levels 11 and 14 to the surfaces with levels 12 and 13 which causes stretch artifacts similar to NMO stretching. The cut-and-paste method takes a packet of seismic data centered at the surface location and shifts them from depth to the level without stretching. In the present example, the packets consist of peaks or troughs. On the right trace, surfaces with levels 12 and 13 do not exist, and hence, no corresponding packets exist for cutting and pasting. The result contains gaps in the level-transformed data indicating the absence of these level surfaces.

Figure 20:
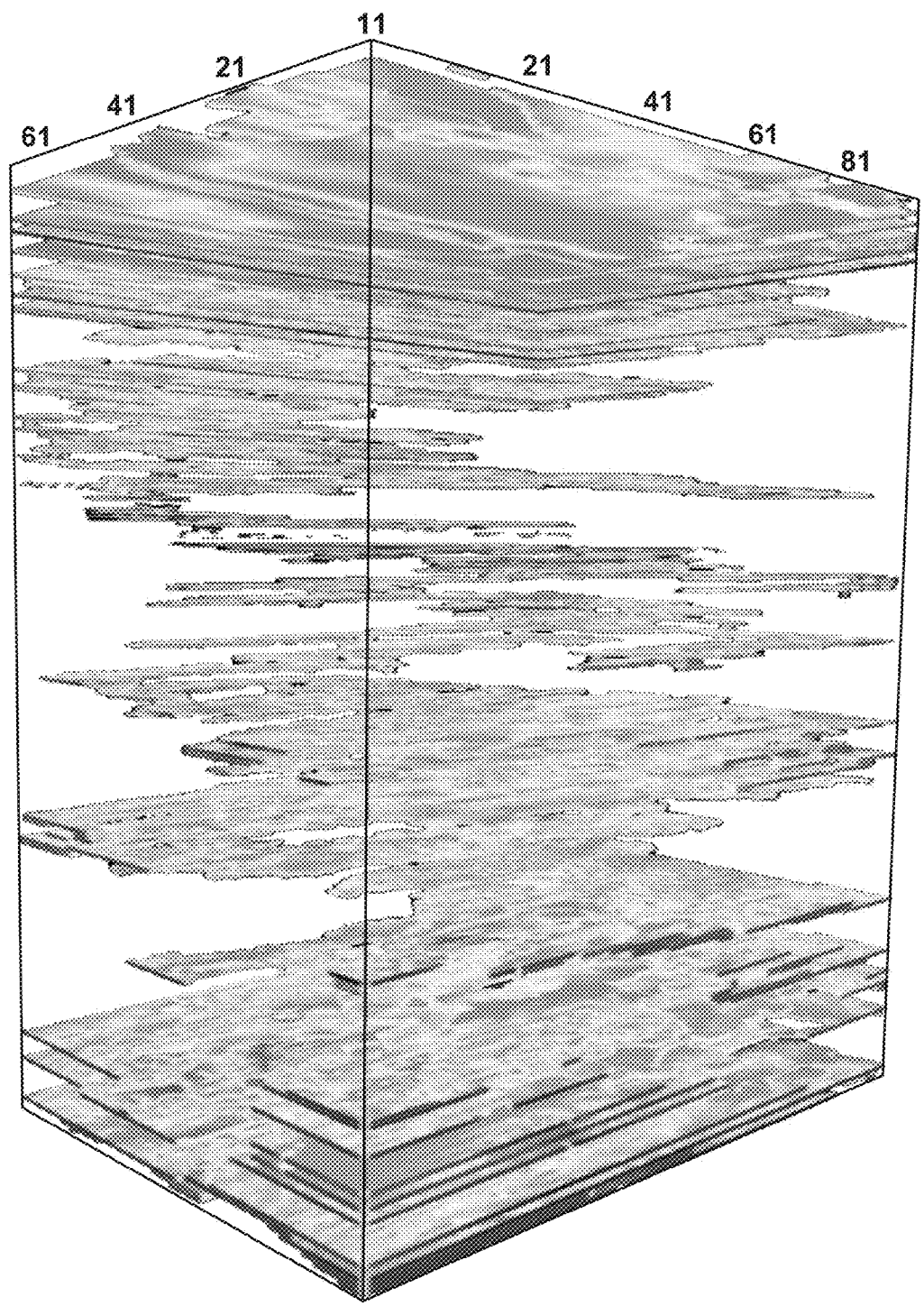
FIG. 20 shows the level transformed seismic data from FIG. 1.

FIG. 20 shows the level transformed seismic data from FIG. 1. The data were transformed from the time to the level domain. Collapsing all the gaps reconstructs the original data.

The skeletonization method described above can be generalized and placed in a larger application context, a method category that is sometimes called pattern recognition. That overarching method is described next.

Figure 21:
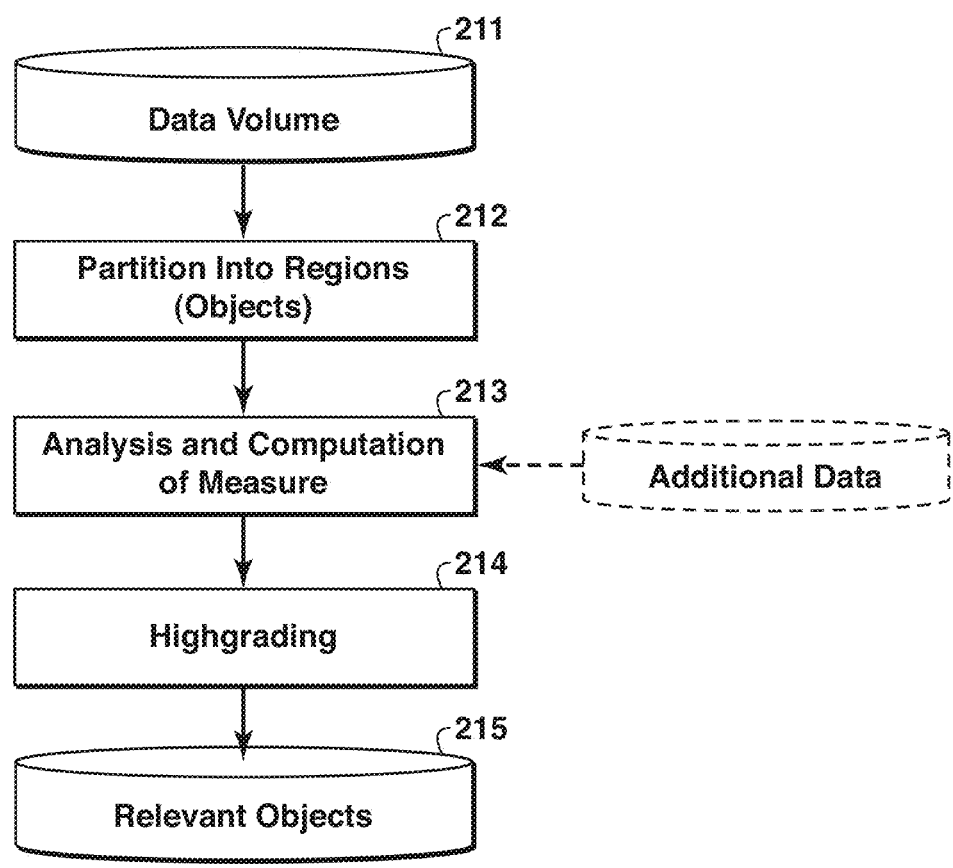
FIG. 21 is a flow chart showing basic steps in one embodiment of the present invention's method for high-grading of geological objects.

The overarching method (see FIG. 21) takes, for example, a geophysical data volume 211, optionally pre-conditions the data and optionally computes a set of features or attributes, and then partitions the volume into regions (step 212). At step 213, each region is analyzed and then assigned with a measure and/or associated with a meaning that allows (at step 214) the prioritization, or high-grading, of the regions for further consideration. The result of this workflow is a set of high-graded regions of interest, what might be called the relevant objects 215. Skeletonization, including the skeletonization method disclosed herein, is one option for the partitioning step 212, and thus, the individual surfaces generated by skeletonization constitute the regions in the broader application. One purpose for the extended work flow outlined above is that even for small data volumes, skeletonization may create thousands to millions of surfaces, which can overwhelm human interpreters and traditional seismic interpretation systems. A method is needed either to select and present the relevant surfaces only, or at least to prioritize them, allowing the interpreter to begin further analysis on the more important ones.

In previously published approaches, geophysical pattern recognition often refers to unsupervised segmentation, or classification and extrapolation based on training data using, for example, a neural network method. Other approaches use this term to denote the detection of seismic events or the discrimination between different kinds of events only. By contrast, the method to be disclosed next can both partition the seismic data into regions and automatically use measured characteristics of those regions to assign a level of geological or geophysical importance to them for hydrocarbon prospecting purposes. But first, brief reviews of some previously published approaches follow.

Meldahl et al. disclose such a supervised learning approach in U.S. Pat. No. 6,735,526 ("Method of Combining Directional Seismic Attributes Using a Supervised Learning Approach"), which combines directional seismic attributes using a neural network to identify and separate geologic features such as gas chimneys.

U.S. Pat. No. 6,560,540 ("Method For Mapping Seismic Attributes Using Neural Networks") to West and May discloses a method to assign seismic facies based on the seismic texture using a neural network trained on example regions for these facies.

U.S. Pat. No. 7,162,463 ("Pattern Recognition Template Construction Applied To Oil Exploration And Production") to Wentland and Whitehead discloses a method for building templates that can be used for the exploration and production of hydrocarbon deposits where templates refer to sets of logically-gated rules used to render voxels with color, opacity, hue and saturation.

U.S. Pat. No. 7,188,092 ("Pattern Recognition Template Application Applied To Oil Exploration And Production") to Wentland and Whitehead discloses a method for applying templates to find deposits of oil and natural gas.

U.S. Pat. No. 7,184,991 ("Pattern Recognition Applied To Oil Exploration And Production") to Wentland et al. discloses additional methods for comparing data against the templates by visual recognition of desired patterns or indication of the presence of a desired or undesired feature within the data.

U.S. Pat. No. 7,308,139 ("Method, System, And Apparatus For Color Representation Of Seismic Data And Associated Measurements") to Wentland and Mokhtar discloses a method for displaying digitized information in a way that allows a human operator to easily detect patterns and characteristics within the data.

U.S. Pat. No. 7,463,552 ("Method For Deriving 3D Output Volumes Using Filters Derived From Flat Spot Direction Vectors") to Padgett discloses a method of determining the existence of and location of hydrocarbon and water fluid contacts by analyzing dips and azimuths in 3D seismic data.

U.S. Pat. No. 5,940,777 ("Automatic Seismic Pattern Recognition Method") to Keskes presents an automatic seismic pattern recognition method that recognizes a given number of seismic patterns specified by pieces of training data.

U.S. Patent Application No. 2008 0,123,469 ("System And Method For Seismic Pattern Recognition") to Wibaux and Guis discloses a method to detect microseismic events based on wavelet energy and comparison against known waveform patterns.

What the foregoing methods may not provide is an automated method that partitions a volume of geological or geophysical data, automatically analyzes each partitioned region for its hydrocarbon potential or relevance to the exploration and production of hydrocarbons, and either ranks regions according to their relevance or suppresses irrelevant ones entirely. This would allow direct searching for accumulation of hydrocarbons, or the detection and evaluation of elements of a subterranean hydrocarbon system, for example reservoir, seal, source, maturation and migration pathways.

This overarching method takes a typically large number of subsurface regions and can analyze them to automatically select or highlight the more relevant ones. An alternative embodiment of this method does not select regions, but instead ranks the regions based on their relevance as determined by their analysis. In the former case, the interpreter or a computer-based system continues work with a greatly reduced subset of regions. In the later case, work may be continued with all regions, but time and resources are allocated based on the region ranks. In the context of this invention, a region is a collection of cells, or voxels, in a subsurface volume defined by one or more objects such as surfaces or geobodies. Moreover, the step of high-grading the objects encompasses, for example, selection, highlighting, prioritizing, or ranking Different embodiments and parameterizations can be cascaded to sequentially remove ever more low priority regions or to improve the rankings.

Subdividing the data volume into regions may begin with an object generation step. Of course manual creation is possible, but automatic generation is more practical and more efficient. Thus, a preferred embodiment of the present invention's geophysical pattern recognition method consists of the following steps, all of which may be programmed to run automatically on a computer: (a) optional application of a data preconditioner and/or attribute computation, (b) generation of objects from data volumes, (c) automatic analysis of the objects to assign a measure, (d) use of the measure to high-grade the objects, and (e) optimal storage of the relevant objects or hierarchy of all objects for further analysis.

Typically, the geophysical data are seismic amplitude volumes, but that invention is by no means so limited. Other potential data include seismic attribute volumes; other types of geophysical data such as seismic velocities, densities, or electrical resistivities; petrophysical data, for example porosity or sand/shale ratio; geological data, for example lithology, environment of deposition, or age of deposition; geologic models and simulations; reservoir simulation information, for example pressures and fluid saturations; or engineering and production data, for example pressures or water cut.

Object generation can be performed in many different ways. Methods include thresholding, binning, or clustering the data; skeletonization or automatic feature tracking; or segmentation. For thresholding, either the user or an algorithm specifies a threshold value. All points with lower (or higher) values are assigned to the background. The remaining data points may be used as point objects or converted to continuous curves, surfaces, or bodies, for example by application of a connected component labeling algorithm. The case where points with values exceeding the threshold are assigned to the background follows by analogy. This case is further generalized by binning the data into user or algorithm specified bins which creates raw objects which can be further refined with a connected component labeling algorithm. Objects can be constructed by clustering of points from one or multiple data sets, or even recursively by clustering of other objects.

Objects can be created by automated or assisted tracking using horizon trackers, horizon pickers, fault trackers, channel trackers, or seed picking. One particular form of horizon picking is seismic skeletonization which automatically picks many surfaces simultaneously. The present invention's method for skeletonization is a preferred option here.

Segmentation refers to a process of partitioning a data volume into multiple objects, or regions (sets of voxels). Each of the voxels in a region is similar with respect to some characteristic or computed property while adjacent regions are significantly different with respect to the same characteristic(s). Clustering-based segmentation is an iterative technique that is used to partition a dataset into a specified number of clusters or objects. Histogram-based methods compute a histogram for the entire dataset and use the peaks and valleys to locate the clusters or objects. A further refinement of this technique is to recursively apply the histogram-seeking method to clusters in the data in order to divide them into increasingly smaller clusters until no more clusters are formed. Methods based on edge detection exploit the fact that region or object boundaries are often closely related to edges, i.e. relatively sharp property transitions. For seismic data, discontinuity or similarity serve as edge detectors. The edges identified by edge detection are often disconnected. To segment an object from a data volume, however, one needs closed region boundaries. Edge gaps are bridged if the distance between the two edges is within some predetermined threshold. Region growing methods take a set of seed points as input along with the data. The seeds mark each of the objects to be segmented. The regions are iteratively grown by comparing all unallocated neighboring voxels to the regions. This process continues until either all voxels are allocated to a region, or the remaining voxels exceed a threshold difference when compared to their neighbors. Level set methods, or curve propagation, evolve a curve or surface towards the lowest potential of a prescribed cost function, for example smoothness. The curves or surfaces either represent the desired objects, for example faults or channel axes; or they correspond to the boundaries of the desired objects, for example salt domes or channels. In the latter case, the curve appears to shrink-wrap the object. Graphs can effectively be used for segmentation. Usually a voxel, a group of voxels, or primordial objects are considered to be the graph vertices, and the graph edges between the vertices are weighted with the (dis)similarity among the neighborhood voxels or objects. Some popular algorithms of this category are random walk, minimum mean cut, minimum spanning tree-based algorithm, or normalized cut. The watershed transformation considers the data or their gradient magnitude as a (multidimensional) topographic surface. Voxels having the highest magnitudes correspond to watershed lines, which represent the region boundaries. Water placed on any voxel enclosed by a common watershed line flows downhill to a common local minimum. Voxels draining to a common minimum forms a catch basin, which represents a segment or object. Model-based segmentation methods assume that the objects of interest have a repetitive or predicable form of geometry. Therefore, one uses a probabilistic model to explore the variation in the shape of the object and then, when segmenting a dataset, imposes constraints using this model as the prior. Scale-space segmentation or multi-scale segmentation is a general framework based on the computation of object descriptors at multiple scales of smoothing. Neural Network segmentation relies on processing small areas of a dataset using a neural network or a set of neural networks. After such processing, the decision-making mechanism marks the areas of the dataset according to the categories recognized by the neural network. Last among the examples mentioned here, in assisted or semi-automatic segmentation, the user outlines the region of interest, for example by manual digitization with computer mouse, and algorithms are applied so that the path that best fits the edge of the object is shown.

Examples of curve objects include but are not limited to well paths, channel axes, fault sticks, horizon tracks, horizon-fault intersections, or generic polygons. Curve objects are automatically created in step 83 of the present invention's skeletonization method. Surfaces or geobodies can be converted to curves by thinning or medial axes transformation.

Surface objects can be converted to geobodies by dilation or thickening of surfaces in a specified direction until another geobody is encountered. The dilation can be performed either upwards, downwards, or simultaneously in both directions. Another method of converting surfaces to geobodies is to assign the samples by polarity or wavelet. Similarly, geobodies can be converted to surfaces by selection of the body top, bottom, or the average thereof. Another body-to-surface conversion method is erosion or thinning in either three dimensions or limited to the vertical direction.

Analysis of the objects (step 213) includes defining or selecting one or more measures that will be used in the next step (214) to high-grade the objects or regions. The measure may be any combination of the object geometries, properties of collocated (secondary) data, and relations between the objects. Geometric measures for objects refer to location, time or depth, size, length, area, volume, orientation, or shape. These measures also include inertia tensor; raw, central, scale- and rotation-invariant moments; or covariance. Some measures, for example curvature, are local measurements in the sense that every point on a curve, surface, or body boundary will have its own local value. In order to obtain one value characterizing the object, one needs to integrate or sample the local ones, for example by selecting its mean, median, or one of the extrema. Moreover, curvature is actually not a scalar quantity but a tensorial one, which allows definition of a range of local curvature measures such the minimum, maximum, mean, most-positive, most-negative, or Gaussian curvature.

Collocated property measures are built by querying a dataset at the locations occupied by the object. For example, one can extract the values from a collocated seismic or attribute dataset such as amplitude or a collocated geologic model such as porosity or environment of deposition, and compute a statistical measure for these values. Statistical measures include average, median, mode, extrema, or variance; or raw, central, scale- and rotation-invariant property-weighted moments. If two collocated properties are extracted, then a measure can be computed by correlation of the collocated values, for example porosity and hydraulic permeability extracted from geologic models or measured along well paths.

Another family of analysis and measurements examines relations between objects. Measures include the distance or similarity to neighboring objects; the total number of neighbors, the number of neighbors above the object or below the object, and ratios thereof; the number of connections to neighboring objects and their quality, or the kind of termination of the object against its neighbors.

Figure 22A:
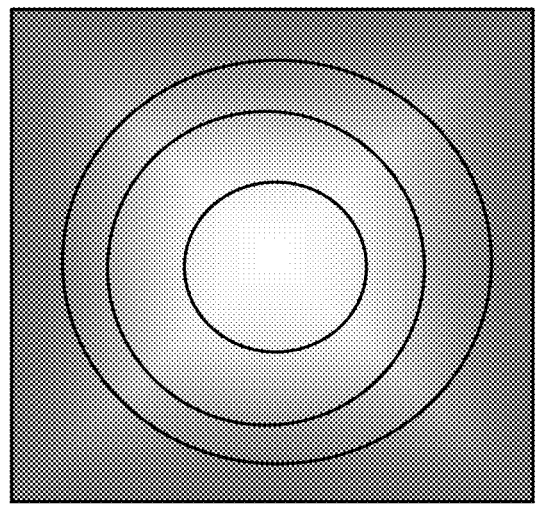
FIGS. 22A-B show the depth contours for two surfaces over the seismic amplitudes extracted along the surfaces.
Figure 22B:
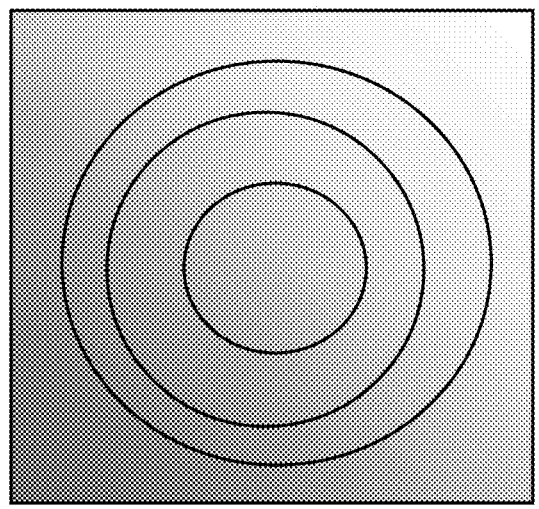

One specific alternative for the analysis of objects (step 213) in the innovative pattern recognition method is the calculation and use of direct hydrocarbon indicators ("DHIs") to high-grade a previously generated set of reflection surfaces, possibly generated through skeletonization. An example of such a DHI is amplitude fit to structure. In a hydrocarbon reservoir, the effect of gravity on the density differences between fluid types generates a fluid contact that is generally flat. Because the strength of a reflection from the top of a hydrocarbon reservoir depends on the fluid in that reservoir, reflection strength changes when crossing a fluid contact. Correlating the surface depths (or times) with seismic attributes such as amplitude strength facilitates rapid screening of all surfaces in a volume for evidence of fluid contacts, and thus, the presence of hydrocarbons. Using the overarching (pattern recognition) method disclosed herein, it is possible to generate or extract many or all surfaces at once by skeletonization and then use the correlation between their depths and amplitudes as an automated screening tool to identify the most interesting surfaces, i.e. the ones indicating hydrocarbon potential. FIGS. 22A-B present schematic examples of two surfaces in map view. Depth or travel time is shown by contours, with larger diameter contours indicating greater depth, and seismic amplitude is represented by brightness shown here in gray scale where white is the brightest (largest amplitude values). In FIG. 22A, the amplitudes correlate with surface depth. Bright amplitudes are found shallow, while dim amplitudes are found deep. Thus, amplitude along the surface correlates with the surface depth contours. The attribute fits the structure, indicating the potential for a hydrocarbon accumulation. In FIG. 22B, amplitude does not vary systematically with surface topography. Seismic amplitude and depth contours are relatively uncorrelated, and do not indicate the presence of hydrocarbons.

Other examples of seismic DHI-based measures for the analysis of surfaces and geobodies include amplitude anomalies, amplitude versus offset (AVO) effects, phase changes or polarity reversals, and fluid contacts or common termination levels. Other geophysical hydrocarbon evidence includes seismic velocity sags, and frequency attenuation; also, electrical resistivity. Amplitude anomaly refers to amplitude strength relative to the surrounding background amplitudes as well as their consistency and persistence in one amplitude volume, for example the full stack. A bright amplitude anomaly has amplitude magnitudes larger than the background, while a dim anomaly has amplitude magnitudes smaller than the background. Comparison of seismic amplitudes at the surface or object location against an estimated background trend allows high-grading based on the anomalous amplitude strength DHI measure.

Comparing collocated amplitudes between different volumes, for example near-, mid-, and far-offset stacks allows assignment of an AVO class. An AVO Class 1 has a clearly discernable positive reflection amplitude on the near-stack data with decreasing amplitude magnitudes on the mid- and far stack data, respectively. An AVO Class 2 has nearly vanishing amplitude on the near-stack data, and either a decreasing positive amplitude with offset or progressively increasing negative amplitude values on the mid- and far-stack data. An AVO class 3 exhibits strong negative amplitudes on the near-stack data growing progressively more negative with increasing offset. An AVO Class 4 exhibits very strong, nearly constant negative amplitudes at all offsets. Preferably, amplitude persistence or consistency within an object is used as a secondary measure within each of the AVO classes. Comparison of partial offset- or angle-stacks at the location of surfaces or objects allows classification by AVO behavior, and thus, high-grading based on the AVO DHI measure. An alternative to partial stacks is the estimation of the AVO parameters A (intercept) and B (gradient) from prestack (offset) gathers at the locations of the surfaces or objects, and use of these parameters for AVO classification or computation of measures such as A*B or A+B.

Evidence of fluid contact is yet another hydrocarbon indicator. A fluid contact can generate a relatively flat reflection, and thus a relatively flat surface. Measuring the flatness of each surface allows the highlighting of fluid contacts. The preferred embodiment of a flatness measure corrects the individual measures with a regional trend, which allows correction for variable water depth and other vertical distortions caused by the overburden. A fluid contact implies a fluid change for example from hydrocarbon gas to water. Sometimes, the boundary between reservoir seal and water-filled reservoir is a seismic surface with positive polarity, while the boundary between seal and gas-filled reservoir is a surface with negative polarity. In such situations, the seal-reservoir boundary corresponds to a surface exhibiting a polarity change from shallow to deep across the fluid contact. Comparison of the wavelet polarity or estimation of the instantaneous wavelet phase along the surface or object allows identification of regions exhibiting a polarity-reversal or phase-change DHI.

An abrupt down dip termination of many nearby surfaces or a locally persistent abrupt change of amplitudes are yet more examples of direct hydrocarbon indicators that can be quantified from surfaces and geobodies. The termination depths of adjacent surfaces or objects are compared or correlated, or preferably the number of similar termination depths in the same region are counted to allow identification of regions exhibiting an abrupt down-dip termination DHI measure.

Locally abrupt change of amplitude can be measured by performance of an edge-detection operation on the amplitudes at the locations of the surfaces or objects and correlation of such edges between nearby surfaces or objects. An alternative to edge detection is correlation of seismic dissimilarity or discontinuity between nearby surfaces or objects.

Using data other than seismic amplitudes enables other measures of direct hydrocarbon indicators. Hydrocarbon gas tends to increase the attenuation of seismic energy, and thus, to lower the frequency content of the seismic signal when compared to the surrounding background. Frequency shifts can be measured and quantified from instantaneous frequency volumes or by comparison of spectrally decomposed volumes. Observation of consistent frequency shifts at the location of the surfaces or objects allows high-grading based on the frequency-shift DHI measure.

Hydrocarbon gas also tends to decrease the speed of seismic waves, which leads to locally sagging surfaces in time domain data. Computing for example the sum of the second derivatives (i.e., the Laplace operator) of the surfaces allows measurement of the sagginess. In severe cases, the gas is even detectable on volumes of seismic velocity obtained by inversion, tomography, or velocity analysis; with velocities at the locations of surfaces objects being lower than the regional trend.

In preferred embodiments of the direct detection of hydrocarbons along surfaces or geobodies, analysis and measurement also includes confidence as a function of data quality, data quantity, prior expectations, and if available, ground truth, for example from calibrated wells.

Elements of the hydrocarbon system include reservoir, seal, and source. An example measure for reservoir or seal quality is deformation, expressed for example by layer developability (J. L. Fernández-Martínez and R. J. Lisle, "GenLab: A MATLAB-based program for structural analysis of folds mapped by GPS or seismic methods," *Computers & Geosciences* 35, 317-326 (2009)). Deviation from a developable geometry implies that bed stretching during folding has occurred. These deviations are therefore linked with straining of the horizon and can be used for highlighting regions of deformation expressed by brittle fracturing or ductile deformation. Brittle deformation implies the potential of fracture-enhanced porosity increasing the storage capacity in a reservoir compartment, but also disrupting a sealing unit. Ductile deformation implies shale-rich strata which are poor reservoirs, but constitute source rocks and serve as seals. Another deformation measure is surface curvature. Deformed regions tend to have surfaces with higher values of curvature indicating the potential for enhanced fracturing which provides additional porosity and the potential for increased storage of hydrocarbons, but also damages seals with the increased risk of trap failure.

Having one or more measures, for example the disclosed DHI measures, for each object allows high-grading of the relevant ones. Selection criteria include thresholding, ranking, prioritizing, classification, or matching. A first approach might be to apply a threshold to the measures and select all objects either exceeding or undercutting the threshold. Another method is ranking the objects in accordance to their measures, and then selecting the top ranked objects, the top ten objects for example. A special case of ranking is prioritizing, where all objects are selected but associated with their rank, for example through their label or a database. Subsequent analyses commence with the highest-ranked object and then go through the objects in accordance to their priorities until a prescribed number of acceptable objects are identified, or until time and/or resource constraints require termination of further activities.

The present inventive method may be utilized in other pattern recognition applications such as volume flattening, hierarchical segmentation, edge and termination detection, DHI detection, hydrocarbon system analysis, and/or data reduction. Other applications of the present inventive methods may include interpretation, data reduction, and/or multiple scenario tracking.

The disclosure has described a method to automatically pick many or all horizons or surfaces (from seismic data characterizing a subsurface region) at once in a topologically consistent manner, i.e., the surfaces are consistent with the stratigraphic law of superposition and thus are stratigraphically consistent. Many stratigraphic processes of sedimentary erosion and deposition occur on approximately flat surfaces where dips rarely exceed a few degrees. The generated strata or layers are thus also approximately flat. Synthetic or post-depositional processes, however, deform these layers and surfaces. Such processes include folding, faulting, or differential compaction. Later stratigraphic processes may erode deformed or dipping strata recreating approximately flat surfaces on which deposition continues. Through the geological history, some geographic areas may undergo many phases of deposition, deformation, and erosion. Eventually, the remaining strata and surfaces exhibit dips ranging from flat to vertical, and in extreme cases, they may even be overturned. Geophysical data represent the present state, and thus, a data slice extracted at a constant depth may intersect layers of different geologic ages. Since deposition at any given time happened on an approximately flat plane, the analysis of stratigraphic environments and their vertical and lateral succession is best performed by extracting a horizon surface of data (also called a horizon slice) that follows a seismic event, and thus, one particular geologic age.

Known methods of analyzing seismic data require time-intensive manual study of seismic data to pick horizons and analyze data corresponding to those horizons. Although studying and analyzing data relating to a single horizon may not require a substantial amount of time, a good-quality study of a seismic volume may require analyzing hundreds or thousands of horizons. Such a study may be prohibitive in computational expense and may take weeks to complete. What is needed is a way to reduce this time required to analyze and interpret seismic data. This could be especially advantageous in a preliminary, reconnaissance or scoping mode of data analysis, where it is advantageous to search a large amount of data in a short time so that further analysis can be focused on areas of most interest.

U.S. Pat. No. 6,850,845 discloses a method for analyzing seismic data in which a geologic time volume is formed from a collocated seismic dataset. Geologic times are obtained corresponding to the seismic data sample points, and the geologic times are stored in the geologic time volume in data storage locations corresponding to the seismic data sample points. In the preferred embodiment, the geologic time volume is created by three-dimensional unwrapping of instantaneous seismic phases. Another way to construct a geologic time volume is from a set of horizons. Further disclosures include the reconciliation of local geologic time volumes for adjacent seismic blocks into one geologic time volume for the combined blocks, full and compressed representations of the geologic time volume, and the correlation of surfaces with geologic times and vice versa.

U.S. Pat. No. 6,708,118 discloses methods that form horizons from geologic time volumes by association of horizons with isocontour surfaces in the geologic time volumes. Methods of creating horizons include specification of a particular geologic time and extraction of an isocontour surface of said time; specification of location, identification of a geologic time for said location, and extraction of an isocontour surface of said time; and specification of a location and a relationship in waveform, distance, or geologic time difference to said location, identification of a geologic time at location with said relationship to the initial location; and extraction of an isocontour surface of said time. Further disclosed are methods to use the geologic time volume to control transparency and opacity for the visualization of seismic data or geologic time volumes.

U.S. Pat. No. 6,853,922 discloses methods to generate attribute volumes based on geologic time volumes. Disclosed attributes of geologic time volumes include difference volumes, discontinuity volumes, fault volumes, unconformity volumes, throw and heave volumes, dip magnitude and orientation volumes, strike volumes, surface normal volumes, closure and spillpoint volumes, and isopach and isopach anomaly volumes. All these attributes are formed from geologic time volumes only, and are only used and interpreted in the domain of the original seismic data.

"Stratal Slicing, Part II: Read 3-D Seismic Data" by Zeng et al. (Geophysics, 63(2), pages 514-522, 1998) discloses a stratal slicing technique for interpretation that is done by tracking frequency-independent, geologic-time-equivalent reference seismic events, then building a stratal time model and an amplitude stratal slice volume on the basis of linear interpolation between references. The new volumes have the same x- and y-coordinate system as the original data, but a z-axis of relative geologic time instead of depth or traveltime as the original data had. The seismic events are picked with the traditional methods of manual or automated tracking of interpreter selected events. Only stratal slice amplitude volumes are disclosed. No further application for stratal slice volumes beyond direct visualization and traditional interpretation techniques are disclosed.

Other information may be found in the following references: U.S. Pat. No. 7,257,488; U.S. Pat. No. 7,248,539; U.S. Patent Application No. 2009/0140319; U.S. Patent Application No. 2009/0204332; de Groot, et al., "How To Create And Use 3D Wheeler Transformed Seismic Volumes," SEG 2006; and Lomask, et al., "Flattening Without Picking," Geophysics 71(4), pp. P13-P20, 2006.

The skeletonization method described herein extracts most or all surfaces in a seismic dataset in topologically consistent manner, and as part of the process, assigns each surface a sequential label number. The topmost surface is labeled number one. Because of the topological consistency, deeper layers can be labeled such that all partially overlapping shallower layers have lower numbers, while all partially overlapping deeper layers have higher ones.

In sculpting, certain regions of the seismic, geophysical, or geologic data are rendered transparent. A slight generalization is to render different regions with different levels of transparency. Some regions may be fully transparent, some completely opaque, while others are rendered with different degrees of semi transparency. For the present discussion, different modes of sculpting include: rendering locations in the seismic, geophysical, or geologic data with an age younger than a specified age transparent; rendering locations with ages older than a specified age transparent; rendering locations with ages similar to a specified age opaque and the others transparent, or vice versa; or rendering locations with ages between two specified ages transparent and the others opaque, or vice versa. Still other modes of sculpting include: rendering transparent the locations in the seismic, geophysical, or geologic data having depths above or below a specified horizon or depth; rendering transparent any data having depths below a specified depth or horizon; rendering locations with depths similar to a specified depth opaque and the others transparent, or vice versa; or rendering locations with depths between two specified depths or horizons transparent and the others opaque, or vice versa. These modes can also be combined with each other.

Advanced sculpting techniques may combine sculpting modes or conditions based both on age and depth, for example by rendering opaque an interval that is given by an age (and thus a surface) and depth differences (or thicknesses) above and/or below the interval. Moreover, sculpting based on age or depth may be combined with additional sculpting conditions based on: attribute values, bins and brackets, or thresholds; proximity to features such as wells, channel axes, faults, horizons, fault sticks or horizon traces; proximity or spatial relationships to objects such as curves, polygons, surfaces, or geobodies; existence or absence of such objects; cultural data; or other conditions imposed by the interpreter or a computer algorithm in an interactive or automated manner.

In an aspect, there is provided a method of inspecting and sculpting seismic data at various depths in a seismic data volume. Using a set of preferably topologically consistent surfaces, or surface patches generated by skeletonization of seismic data or other methods, the method allows inspection and/or chronological panning through a 3D seismic volume for a reconnaissance study of the subsurface geology.

Figure 23:
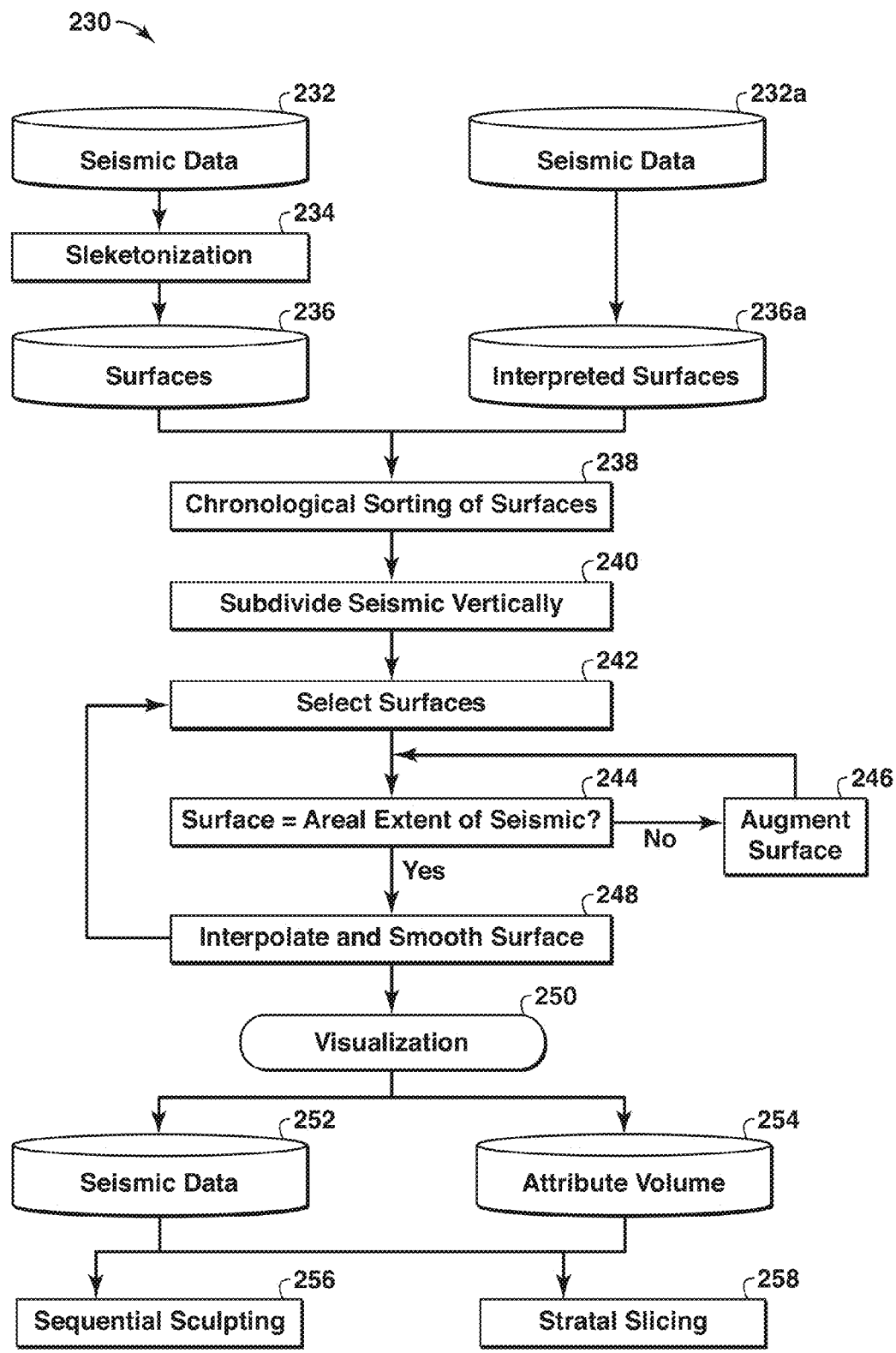
FIG. 23 is a flowchart showing a method according to disclosed aspects.

FIG. 23 is a flowchart showing a method 230 according to disclosed aspects. At block 232 seismic data is obtained. FIG. 1 depicts an example of seismic data, specifically showing seismic amplitude as previously discussed, which has been obtained for a depth D below an area A. The seismic volume V defined by depth D and area A contains the seismic data arranged according to seismic depth, which equates to the two-way travel time of a seismic signal traveling through the subsurface region represented by the seismic volume. At block 234 the seismic data is subjected to a surface extraction process, such as the skeletonization process previously described herein, to obtain or generate surfaces or surface patches (block 236). FIG. 2 shows an example of topologically consistent skeletonized surfaces S derived from seismic volume V according to the principles described herein. The dimensions of the volume of surfaces V' are proportional to the dimensions of seismic volume V, such that the depth dimension D' is equal or proportional to the depth D and the horizontal area A' is equal or proportional to area A. Alternatively, other methods of obtaining surfaces, such as manual interpretation of the seismic data (block 232a), may be used to provide a plurality of surfaces, such as the interpreted surfaces represented at block 236a.

At block 238 the surfaces S in the volume of surfaces V' are enumerated. In one aspect, this enumeration comprises a chronological sorting. In other words, the surfaces are sorted according to a best estimate of a time of deposition of each surface. In such a sort, surfaces having an older deposit date are sorted and arranged below surfaces having a more recent deposit date. This chronological sort may be analogous to the topological sort previously described herein. Another way to complete the chronological sort is by simple top-down enumeration of the surfaces. After enumerating the surfaces, one or more surfaces are selected for further analysis. The surfaces may be selected by selecting every Mth enumerated surface, where M is an integer that is less than the number of enumerated surfaces. In another aspect, the surfaces may be selected based on an age or depth parameter. In still another aspect, the surfaces may be selected randomly. In still another aspect, a plane may be defined in the volume of surfaces, and a surface that intersects that plane is a selected surface. The oldest/deepest or youngest/shallowest most complete surface intersecting the plane may be the selected surface. This concept may be iterated such that multiple planes are defined and one or more surfaces are selected for each plane according to techniques disclosed herein. The planes may be substantially horizontal (which may represent a seismic return time) or may be non-horizontal and/or non-planar as desired. Yet another aspect of selecting surfaces is shown in detail in FIG. 23. At block 240 the volume of surfaces V' is divided or partitioned chronologically, which is accomplished by defining one or more substantially horizontal planes P having an extent substantially similar to area A. These horizontal planes may be placed at various depths along depth dimension D' at regular or irregular spacings. For preliminary reconnaissance of the subsurface region represented by seismic volume V and the volume of surfaces V', the horizontal planes may be equally spaced, but unequal spacing may be appropriate if, for example, prior interpretation suggests a focus on a particular depth or depth range of the seismic data.

For each interval N defined by the region between adjacent horizontal planes, at block 242 one or more of the surfaces S is selected. It should be noted that although planes P may be substantially horizontal, because of geologic aging processes the surfaces may not be completely horizontal. The selected surface may be the surface, within or intersecting the interval, having the smallest label or youngest age. Alternatively, the selected surface may be the surface, within or intersecting the interval, having the largest label or oldest age. Other strategies for selecting surfaces may be used. For various reasons the surfaces or surface patches obtained or generated by skeletonization or interpretation (or other methods) may not have an extent equal to area A' (and area A of seismic volume V). FIG. 16C shows example incomplete surfaces. However, it is helpful to have a surface covering or substantially covering the area A' so that geologic attributes may be assigned thereto and/or viewed thereon. Block 244 determines whether a selected surface substantially covers or extends across area A'. If not, at block 246 the selected surface is augmented using nearby surfaces. If it can be assumed that surfaces adjacent in depth or age tend to have similar characteristics, data from the closest (in age or depth) surface above or below the selected surface (or the closest overall surface to the selected surface) may be used to fill in incomplete portions of the selected surface. Alternatively, a nearby surface having similar geologic or geophysical attributes (rock type, porosity, seismic reflectivity, etc.) may be selected to fill in incomplete portions of the selected surface. For example, a selected surface having a specified seismic reflectivity may use a nearby surface with a similar reflectivity to fill in its incomplete portions. The augmentation of a selected surface (blocks 244 and 246) is repeated until the entire area A' or substantially the entire area A' is covered, and then at block 248 the selected surface is subjected to known interpolation and smoothing processes to provide a digitized or mathematical model of the selected surface. Method 230 repeats steps 242, 244, 246 and 248 until all the selected surfaces of all intervals have been completed.

Either top-down, bottom-up, or in an interpreter specified order, at block 250 the selected surfaces are used to extract one or multiple seismic attributes from the seismic data (block 252) or an attribute volume or database (block 254) and then displayed with these attributes draped over them. These attributes may include geologic or geophysical data. As used herein, "displaying" or "display" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software). The attributes can also be presented as horizon slices or maps for the formed surfaces (block 258). Alternatively, the individual surfaces may be used to sculpt in a sequential manner (block 256) to control the opacity during volume visualization of attribute volumes. For example, voxels belonging to the currently active surface are rendered opaque, while the others are rendered partially or fully transparent. Other sculpting modes, methods, and techniques, previously described herein, may be used as well.

FIGS. 24B, 24C, 24D and 24E depict a top-down sequence of selected and augmented surfaces 270, 272, 274, 276 taken from a volume of surfaces 260 shown in FIG. 24A. Surface 270 is closest to the top of a seismic volume, while surface 276 is furthest from the top. When surfaces 270-276 are displayed sequentially, voxels associated with the surface currently displayed are fully opaque, while voxels associated with the other surfaces are rendered transparent. Inspection of surfaces 272-276 indicates the presence of channels 272a, 274a, 276a which may be structures conducive to the movement or retention of hydrocarbons. A user or interpreter viewing surfaces 270-276 in sequence can quickly determine which portions of the subsurface region corresponding to the analyzed seismic data are deserving of further study and which portions are not. This chronological panning or scrolling through selected surfaces can be seen to be an especially advantageous tool for analyzing or interpreting geologic attributes of a subsurface region as more and more surfaces are selected, augmented, and visualized.

Instead of limiting the displayed surfaces to a thickness of one voxel, the formed surfaces may be extended in thickness by a number of voxels upwards and/or downwards. The number of voxels can be specified in an absolute manner, or in a manner relative to the formed surfaces right above or below the currently active one. The number of voxels can also be specified by displaying all voxels within a given range of seismic travel time (for example, 50 milliseconds) before, after, surrounding, or otherwise associated with the surfaces. A special case of such thick surfaces is to extend the active surface all the way up or down to the next formed surface, which effectively sculpts out the initial intervals. Other sculpting modes, methods or techniques described herein, including the advanced sculpting methods referenced previously, may be used to display the surfaces.

More detailed examination of geological features in a specific interval, for example found by using the chronological panning workflow, may be performed by surface-based volume sculpting preferably using the skeleton surface patches. The interpreter specifies a depth and perhaps a location of interest. Following the methodology disclosed for the chronological panning workflow, a complete surface is formed by search for an initial surface, augmentation with other surface patches at location with gaps, and interpolation and smoothing. A thick surface or layer is formed around this surface by up- and downward extension and then used to control the opacity of the seismic data, for example by rendering data outside this layer more transparent and data inside this data more opaque.

Figure 25:
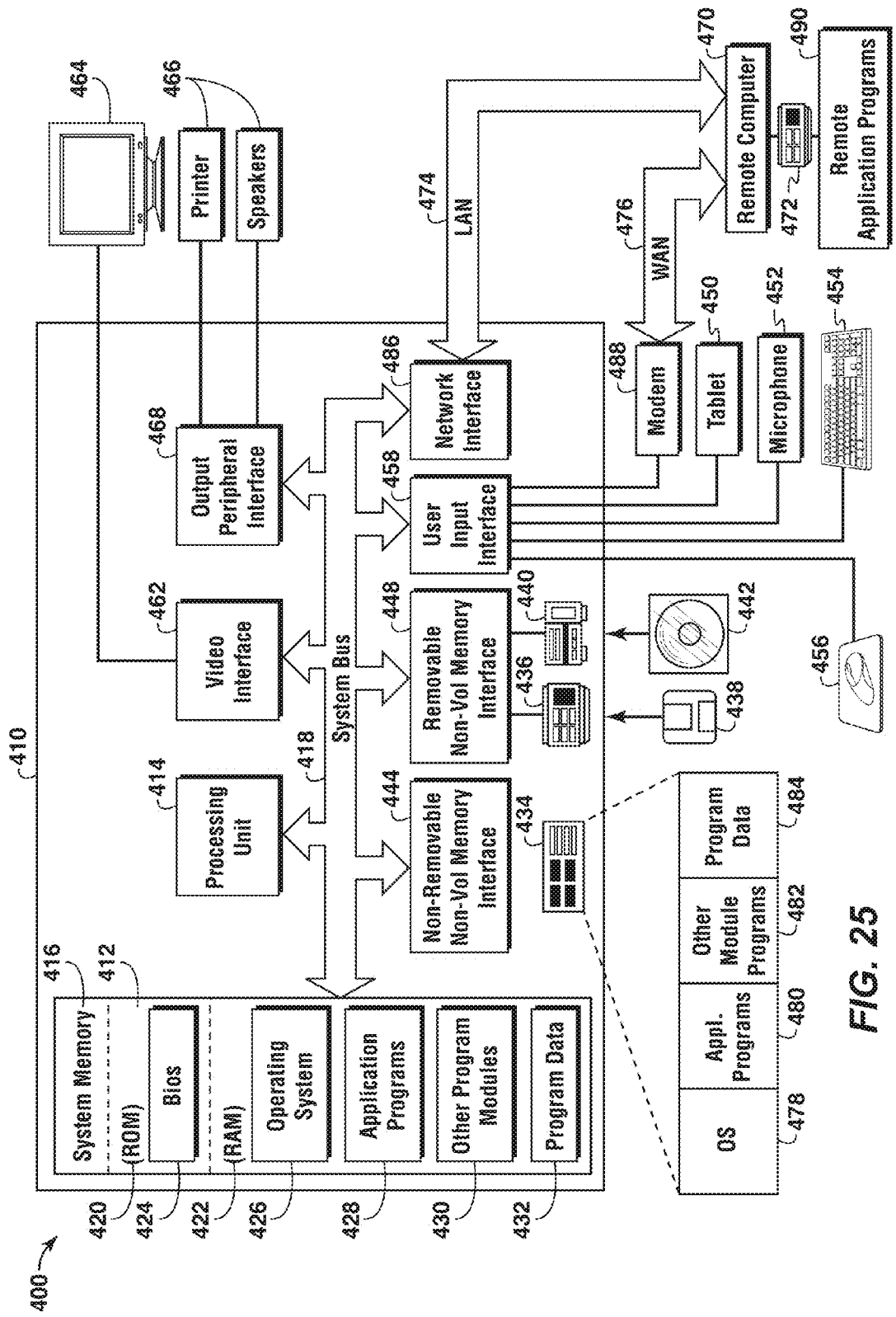
FIG. 25 is a block diagram representing a computing environment.

FIG. 25 illustrates a system of a computing environment 400 for implementing disclosed aspects. Computing environment 400 includes a computing device in the form of a computing system 410, which may be a UNIX-based workstation or commercially available from Intel, IBM, AMD, Motorola, Cyrix and others. Components of the computing system 410 may include, but are not limited to, a processing unit 414, a system memory 416, and a system bus 446 that couples various system components including the system memory to the processing unit 414. The system bus 446 may be any of several types of bus structures including a memory bus or memory controller, a peripheral bus, and a local bus using any of a variety of bus architectures.

Computing system 410 typically includes a variety of computer readable media. Computer readable media may be any available media that may be accessed by the computing system 410 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 410. The system memory 416 includes computer storage media in the form of volatile and/or nonvolatile memory such as read only memory (ROM) 420 and random access memory (RAM) 422. A basic input/output system 424 (BIOS), containing the basic routines that help to transfer information between elements within computing system 410, such as during start-up, is typically stored in ROM 420. RAM 422 typically contains data and/or program modules that are immediately accessible to and/or presently being operated on by processing unit 414. By way of example, and not limitation, FIG. 25 illustrates operating system 426, application programs 430, other program modules 430 and program data 432.

Computing system 410 may also include other removable/non-removable, volatile/nonvolatile computer storage media. By way of example only, FIG. 25 illustrates a hard disk drive 434 that reads from or writes to non-removable, nonvolatile magnetic media, a magnetic disk drive 436 that reads from or writes to a removable, nonvolatile magnetic disk 438, and an optical disk drive 440 that reads from or writes to a removable, nonvolatile optical disk 442 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 434 is typically connected to the system bus 446 through a non-removable memory interface such as interface 444, and magnetic disk drive 436 and optical disk drive 440 are typically connected to the system bus 446 by a removable memory interface, such as interface 448. The drives and their associated computer storage media, discussed above and illustrated in FIG. 25, provide storage of computer readable instructions, data structures, program modules and other data for the computing system 410. In FIG. 25, for example, hard disk drive 434 is illustrated as storing operating system 478, application programs 480, other program modules 482 and program data 484. These components may either be the same as or different from operating system 426, application programs 430, other program modules 430, and program data 432. Operating system 478, application programs 480, other program modules 482, and program data 484 are given different numbers hereto illustrates that, at a minimum, they are different copies.

A user may enter commands and information into the computing system 410 through input devices such as a tablet, or electronic digitizer, 450, a microphone 452, a keyboard 454, and pointing device 456, commonly referred to as a mouse, trackball, or touch pad. These and other input devices often may be connected to the processing unit 414 through a user input interface 458 that is coupled to the system bus 418, but may be connected by other interface and bus structures, such as a parallel port, game port or a universal serial bus (USB).

A monitor 460 or other type of display device may be also connected to the system bus 418 via an interface, such as a video interface 462. The monitor 460 may be integrated with a touch-screen panel or the like. The monitor and/or touch screen panel may be physically coupled to a housing in which the computing system 410 is incorporated, such as in a tablet-type personal computer. In addition, computers such as the computing system 410 may also include other peripheral output devices such as speakers 464 and printer 466, which may be connected through an output peripheral interface 468 or the like.

Computing system 410 may operate in a networked environment using logical connections to one or more remote computers, such as a remote computing system 470. The remote computing system 470 may be a personal computer, a server, a router, a network PC, a peer device or other common network node, and typically includes many or all of the elements described above relative to the computing system 410, although only a memory storage device 472 has been illustrated in FIG. 25. The logical connections depicted in FIG. 25 include a local area network (LAN) 474 connecting through network interface 486 and a wide area network (WAN) 476 connecting via modem 488, but may also include other networks. Such networking environments are commonplace in offices, enterprise-wide computer networks, intranets and the Internet. For example, computer system 410 may comprise the source machine from which data is being migrated, and the remote computing system 470 may comprise the destination machine. Note however that source and destination machines need not be connected by a network or any other means, but instead, data may be migrated via any machine-readable media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. For example, a storage medium may be coupled to the processor such that the processor may read information from, and write information to, the storage medium. In the alternative, the storage medium may be integral to the processor. The processor and the storage medium may also reside in an application-specific integrated circuit (ASIC). The bus may be an optical or conventional bus operating pursuant to various protocols that are well known in the art. One system that may be used is a Linux workstation configuration with a Linux 64-bit or 32-bit Red Hat Linux WS3 operating system, and an NVIDIA Quadro graphics card. However, the system may operate on a wide variety of hardware.

The disclosed aspects may be incorporated in machine-readable code that may be used with a computing system such as computing system 310. Such code may effectuate or execute any or all blocks or steps of the disclosed aspects according to computer code programming techniques.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management.

Aspects disclosed herein provide a method of analyzing and interpreting seismic data that, in a reconnaissance mode, is faster than known methods by two or more orders of magnitude in sculpting and rendering horizons and seismic data associated therewith. Furthermore, the skeletonization process is more rigorous than known manual methods of obtaining surfaces because it can provide tens of thousands (or more) surfaces corresponding to a seismic volume in a short period of time. The increased number of surfaces increases the chances of obtaining accurate geologic attributes for a seismic volume and for identifying areas having a potential for hydrocarbon development.

Another advantage of disclosed aspects is that because the selected and augmented surfaces are digitized, a user or interpreter can quickly pan or scroll through visually presented sequences of the surfaces, thereby rapidly ascertaining subsurface regions and specific depths having formations or attributes conducive to hydrocarbon development.

The following numbered statements are part of the disclosure.

1. A computer-implemented method for transforming a seismic data volume acquired in a seismic survey to a corresponding data volume which, when visually displayed, shows a representation of subterranean reflector surfaces that gave rise to the data by reflecting seismic waves, said method comprising:

(a) picking seismic reflections from the data volume, and creating initial surfaces from the picks;

(b) breaking surfaces into smaller parts ("patches") that are predominantly topologically consistent;

(c) merging neighboring patches in a topologically consistent way, thus extracting topologically consistent reflection-based surfaces from the seismic data volume; and (d) displaying the extracted surfaces for visual inspection or interpretation, or saving their digital representations to computer memory or data storage.

2. The method of statement 1, further comprising using the topologically consistent reflection-based surfaces to predict or analyze potential for hydrocarbon accumulations.

3. The method of statement 1, wherein topologically consistent comprises verifying that surfaces satisfy at least one of (i) no self overlaps; (ii) local consistency; and (iii) global consistency.

4. The method of statement 1, wherein the seismic reflections are picked by correlating reflection events between neighboring traces in the seismic data volume.

5. The method of statement 4, wherein the picking is automated, using a computer.

6. The method of statement 1, wherein breaking surfaces into patches comprises shrinking initial surfaces to lines, removing joints in the lines to form more individual lines, shrinking individual lines to single-voxel points (characteristic points), and propagating the characteristic points along the initial surfaces by adding neighboring voxels to form patches of voxels.

7. The method of statement 6, wherein each characteristic point is labeled with a different label, and the label is applied to the patch formed around the characteristic point, thus providing a means to keep track of different patches as they are expanded by propagation.

8. The method of statement 6, wherein controlled marching is used to propagate points along initial surfaces.

9. The method of statement 6, wherein shrinking of an initial surface to a line comprises successively removing one-voxel-thick layers from the periphery of the surface until a continuous line of individual voxels results.

10. The method of statement 6, further comprising deleting joint voxels from lines to form more lines before shrinking lines to points.

11. The method of statement 6, wherein topological consistency is enforced during the propagation of points.

12. The method of statement 1, wherein merging neighboring patches in a topologically consistent way is performed by developing overlap and neighbor tables for the patches, generating an order for merge pair candidates by sorting the overlap and neighbor tables, checking candidate merges for topological consistency using the overlap and neighbor tables, and accepting topologically consistent mergers.

13. The method of statement 12, wherein the sort order of the neighbor table is based on geometries of, or geometry differences between, the neighboring patches, or is based on the statistical properties of, or the differences between, one or more attributes extracted from seismic data collocated with the patches.

14. The method of statement 1, further comprising spatially flattening the topologically consistent reflection-based surfaces into an order representing the sequence of deposition using the topologically consistent reflection-based surfaces and using the flattened surfaces to predict or analyze potential for hydrocarbon accumulations.

15. The method of statement 14, further comprising flattening the associated seismic data within which the topologically consistent reflection-based surfaces exist.

16. The method of statement 15, wherein the seismic data flattening is performed by nonlinear stretch of the seismic data or by a cut and past method.

17. The method of statement 1, further comprising creating a visual representation showing depositional order or hierarchy of the topologically consistent reflection-based surfaces.

18. The method of statement 17, further wherein the visual representation is a tree and comprising using the tree to select one or more surfaces for visualization.

19. The method of statement 1, further comprising using the patches to segment the seismic data volume into three-dimensional bodies or inter-surface packages that represent geologic units that were deposited within a common interval, and using them to analyze for hydrocarbon potential.

20. The method of statement 2, further comprising analyzing the location and characteristics of edges and termination points of the topologically consistent reflection-based surfaces and using that to assist in predicting or analyzing potential for hydrocarbon accumulations.

21. The method of statement 2, further comprising analyzing attributes and geometric characteristics of the topologically consistent reflection-based surfaces and/or the associated seismic data at the locations of said surfaces to assist in predicting or analyzing potential for hydrocarbon accumulations.

22. The method of statement 1, further comprising using the patches or topologically consistent reflection-based surfaces to reduce the amount of information contained in the seismic data volume in order, thereby reducing storage or computational efficiency requirements for subsequent data processing of the seismic data.

23. The method of statement 1, wherein merging neighboring patches is restricted to patches that trace back before shrinking to the same initial surface.

24. The method of statement 12, wherein topological consistency is enforced in merging neighboring patches using a depth-limited search method comprising:

(a) creating a graph structure based on the overlap table that captures relative positions of the patches in the data volume;

(b) assigning a depth attribute to each patch such that comparison of the depth attributes of any two patches indicates whether one of the patches overlies the other;

(c) using the graph structure and the depth attributes to check a merger proposed based on the neighbor table for topological consistency; and (d) updating the depth attributes and graph structure as patch mergers are accepted.

25. The method of statement 1, wherein the extracted surfaces are displayed or saved as an earth model.

26. A computer program product, comprising a computer usable medium having a computer readable program code embodied therein, said computer readable program code adapted to be executed to implement a method for reducing a seismic data volume to reflection-based surfaces, said method comprising:

(a) picking seismic reflections from the data volume, and creating initial surfaces from the picks;

(b) breaking surfaces into smaller parts ("patches") that are predominantly topologically consistent; and (c) merging neighboring patches in a topologically consistent way, thus extracting topologically consistent reflection-based surfaces from the seismic data volume.

27. A method for producing hydrocarbons from a subsurface region, comprising:

(a) obtaining a seismic data volume representing the subsurface region;

(b) obtaining a prediction of the potential for hydrocarbon accumulations in the subsurface region based at least partly on topologically consistent reflection-based surfaces extracted from the seismic data volume by a method described in statement 1, which is incorporated herein by reference; and (c) in response to a positive prediction of hydrocarbon potential, drilling a well into the subsurface region and producing hydrocarbons.

28. A method for merging surfaces identified in a seismic or seismic attribute data volume to form larger surfaces representing subterranean geologic structure or geophysical state of matter, comprising merging neighboring surfaces in a topologically consistent way.

29. A method for exploring for hydrocarbons, comprising:

(a) obtaining a data volume of seismic or seismic attribute data resulting from a seismic survey;

(b) subdividing the data volume into parts, called objects;

(c) forming regions of one or more objects;

(d) developing or selecting a measure for ranking the regions in terms of potential to represent a geobody, interface surface, or intersection of these, or other physical geologic structure or geophysical state of matter that is indicative of hydrocarbon deposits; and (e) using the measure to prioritize regions, and then using the prioritization to assess the volume for hydrocarbon potential.

30. The method of statement 29, wherein each object contains cells classified together using one or more criteria based on the data or attribute thereof or other physical reasonableness criterion.

31. The method of statement 29, further comprising using the region prioritization to transform the data volume into a geophysical earth model, and using the earth model to assess the volume for hydrocarbon potential.

32. The method of statement 29, wherein (b) is performed using a method described in statement 1, which is incorporated herein by reference.

33. The method of statement 29, wherein the measure in (d) comprises a direct hydrocarbon indicator (DHI).

34. Method for analysis of hydrocarbon potential of subterranean regions by generating surfaces or geobodies and analyzing them for hydrocarbon indications. Reflection-based surfaces may be automatically created in a topologically consistent manner where individual surfaces do not overlap themselves and sets of multiple surfaces are consistent with stratigraphic superposition principles. Initial surfaces are picked from the seismic data (41), then broken into smaller parts ("patches") that are predominantly topologically consistent (42), whereupon neighboring patches are merged in a topologically consistent way (43) to form a set of surfaces that are extensive and consistent ("skeleton"). Surfaces or geobodies thus extracted may be automatically analyzed and rated (214) based on a selected measure (213) such as one or more direct hydrocarbon indications ("DHI"), e.g. AVO classification. Topological consistency for one or more surfaces may be defined as no self overlap plus local and global consistency among multiple surfaces (52).

The foregoing application is directed to particular embodiments of the present invention for the purpose of illustrating them. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented method of searching and analyzing a seismic data volume acquired in a seismic survey to determine potential for hydrocarbon accumulations in an associated subsurface region, comprising:

obtaining surfaces describing the seismic data volume;
enumerating the surfaces;
selecting at least one enumerated surface;
augmenting, by a computer processor, the at least one selected surface when the selected surface does not substantially cover an area associated with the seismic data volume, said augmenting being performed until all selected surfaces substantially cover the area, wherein substantially is judged against a pre-selected criterion; and
displaying the at least one selected surface, with geologic or geophysical data associated therewith, for visual inspection or interpretation, or saving digital representations thereof to computer memory or data storage.

2. The method of claim 1, wherein the obtained surfaces are derived from the seismic data volume using skeletonization.

3. The method of claim 1, wherein the at least one selected surface is displayed sequentially.

4. The method of claim 3, wherein the at least one selected surface is displayed sequentially according to an enumeration order of the at least one selected surface.

5. The method of claim 1, wherein geologic or geophysical data within a specified distance or depositional age from each surface is displayed or saved.

6. The method of claim 1, wherein geologic or geophysical data between adjacent surfaces is displayed or saved.

7. The method of claim 1, wherein geologic or geophysical data on each surface is displayed or saved.

8. The method of claim 1, wherein geologic or geophysical data within a specified seismic travel time of each surface is displayed or saved.

9. The method of claim 1, wherein selecting at least one enumerated surface comprises:

defining one or more intervals in a volume in which the surfaces are enumerated;
selecting at least one surface associated with each of the one or more intervals;
for each interval, augmenting the at least one surface when the surface does not substantially cover an area associated with the seismic data volume, said augmenting being performed until all selected surfaces in each selected interval substantially cover the area; and
for each interval, displaying the surface, with geologic or geophysical data associated therewith, for visual inspection or interpretation, or saving digital representations thereof to computer memory or data storage.

10. The method of claim 1, wherein each of the one or more intervals is defined as a region between two substantially horizontal planes in the volume in which the surfaces are enumerated.

11. The method of claim 1, wherein augmenting the at least one surface comprises:

adding seismic data from surfaces having an identifiable relationship with said at least one surface.

12. The method of claim 11, wherein the identifiable relationship is one of a closest geologic age or depth, a nearest older or younger age, a most proximal older or younger depth, and a common geologic or geophysical attribute.

13. The method of claim 1, further comprising interpolating and smoothing data relating to each surface when each surface substantially covers the area, to thereby digitize the surface.

14. The method of claim 1, further comprising using the displayed data to predict or analyze potential for hydrocarbon accumulations.

15. The method of claim 1, further comprising creating a visual representation of the enumerated surfaces.

16. The method of claim 1, wherein the surfaces are displayed or saved as an earth model.

17. The method of claim 1, wherein the obtained surfaces are topologically consistent.

18. The method of claim 17, wherein topologically consistent comprises verifying that surfaces satisfy at least one of (i) no self overlaps, (ii) local consistency, and (iii) global consistency.

19. The method of claim 1, wherein enumerating the surfaces comprises a chronological sorting.

20. The method of claim 1, wherein enumerating the surfaces comprises a top-down enumeration.

21. The method of claim 1, wherein the at least one enumerated surface is selected by selecting every Mth enumerated surface, where M is an integer less than the number of enumerated surfaces.

22. The method of claim 1, wherein the at least one enumerated surface is selected according to one of age and depth.

23. The method of claim 1, further comprising:
predicting a presence of hydrocarbons in the subsurface region using the displayed surfaces; and
managing hydrocarbons based on the predicted presence.

24. The method of claim 1, wherein the at least one enumerated surface is selected by:
generating one or more planes in a volume in which the surfaces are enumerated; and
for each plane, selecting an enumerated surface associated therewith.

25. The method of claim 24, wherein the one or more planes represent one or more seismic return times.

26. The method of claim 24, wherein the one or more planes represent an estimated age or depth in the volume in which the surfaces are enumerated.

27. A computer-implemented method of searching and analyzing a seismic data volume acquired in a seismic survey to determine potential for hydrocarbon accumulations in an associated subsurface region, comprising:
obtaining surfaces describing the seismic data volume;
enumerating the surfaces;
defining one or more intervals in a volume in which the surfaces are enumerated;
selecting at least one surface associated with each of the one or more intervals;
for each interval, augmenting, b a computer processor, the at least one surface when the surface does not substantially cover an area associated with the seismic data volume, said augmenting being performed until all selected surfaces in each selected interval substantially cover the area, wherein substantially is judged against a pre-selected criterion; and
for each interval, displaying the surface, with geologic or geophysical data associated therewith, for visual inspection or interpretation, or saving digital representations thereof to computer memory or data storage.

28. The method of claim 27, wherein each of the one or more intervals is defined as a region between two planes in the volume in which the surfaces are arranged.

29. A non-transitory machine readable medium containing computer instructions or code stored therein for causing a computer processor to perform a method comprising:
obtaining surfaces describing a seismic data volume that represents a subsurface region;
enumerating the surfaces;
selecting at least one enumerated surface;
augmenting the at least one selected surface when the selected surface does not substantially cover an area associated with the seismic data volume, said augmenting being performed until all selected surfaces substantially cover the area, wherein substantially is judged against a pre-selected criterion; and
displaying the at least one selected surface, with geologic or geophysical data associated therewith, for visual inspection or interpretation, or saving digital representations thereof to computer memory or data storage.

* * * * *